United States Patent [19]

Ikeda et al.

[11] Patent Number: 5,034,806

[45] Date of Patent: Jul. 23, 1991

[54] IMAGE PROCESSING APPARATUS AND METHOD

[75] Inventors: Yoshinori Ikeda; Koichi Katoh, both of Kanagawa; Mitsuru Kurita, Tokyo; Hiroyuki Ichikawa, Kanagawa, all of Japan

[73] Assignee: Canon Kabushiki Kaisha, Tokyo, Japan

[21] Appl. No.: 585,041

[22] Filed: Sep. 18, 1990

Related U.S. Application Data

[63] Continuation of Ser. No. 436,065, Nov. 14, 1989, abandoned.

[30] Foreign Application Priority Data

Nov. 14, 1988 [JP] Japan .................................. 63-287092

[51] Int. Cl.$^5$ ................................................ H04N 1/46
[52] U.S. Cl. ......................................... 358/75; 358/78; 358/80; 358/450
[58] Field of Search ....................... 358/75, 78, 80, 450

[56] References Cited

U.S. PATENT DOCUMENTS

| | | | |
|---|---|---|---|
| 4,403,249 | 9/1983 | Knop | 358/80 |
| 4,417,805 | 11/1983 | Kishi | 358/300 |
| 4,682,190 | 7/1987 | Ikeda | 346/154 |
| 4,896,208 | 1/1990 | Moriya | 358/78 |
| 4,905,097 | 2/1990 | Watanabe et al. | 358/456 |

Primary Examiner—Howard W. Britton
Attorney, Agent, or Firm—Fitzpatrick, Cella, Harper & Scinto

[57] ABSTRACT

An image processing apparatus includes first and second input units for inputting an image data, a memory for storing first image data input by the first or second input unit, and a processor for processing second image data input by the first or second unit using the image data stored in the memory.

74 Claims, 24 Drawing Sheets

FIG. 1
ORIGINAL    COPY
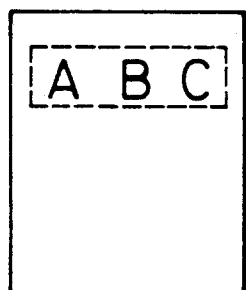 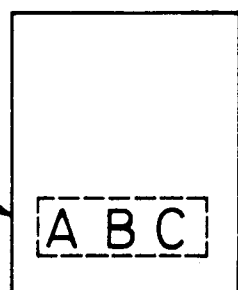    ①
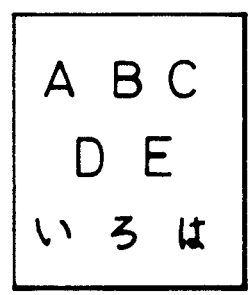 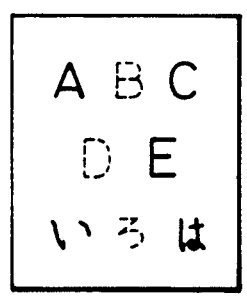    ②
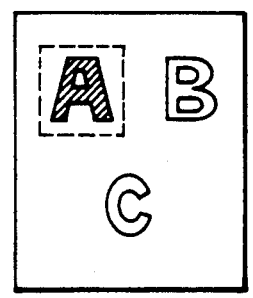 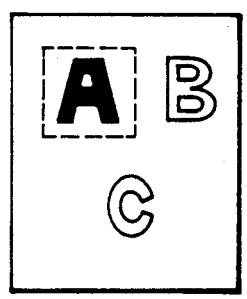    ③
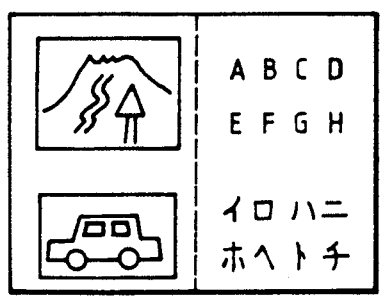 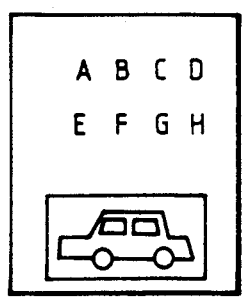    ④

FIG. 2
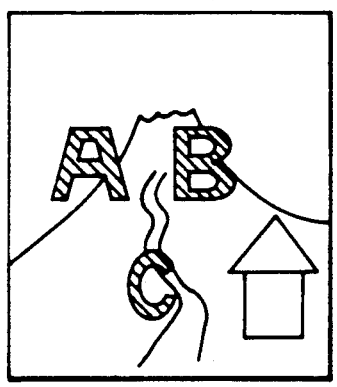
①
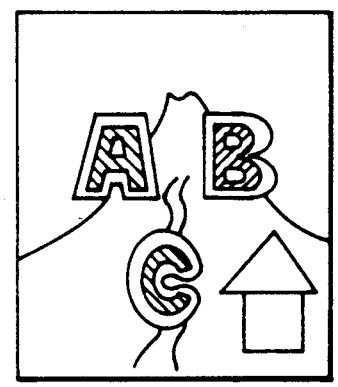
②
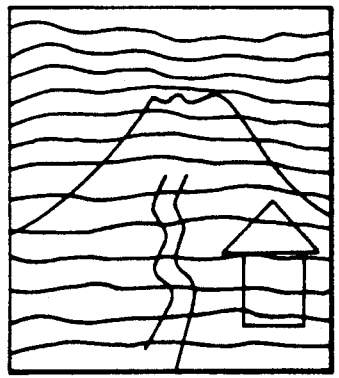
③

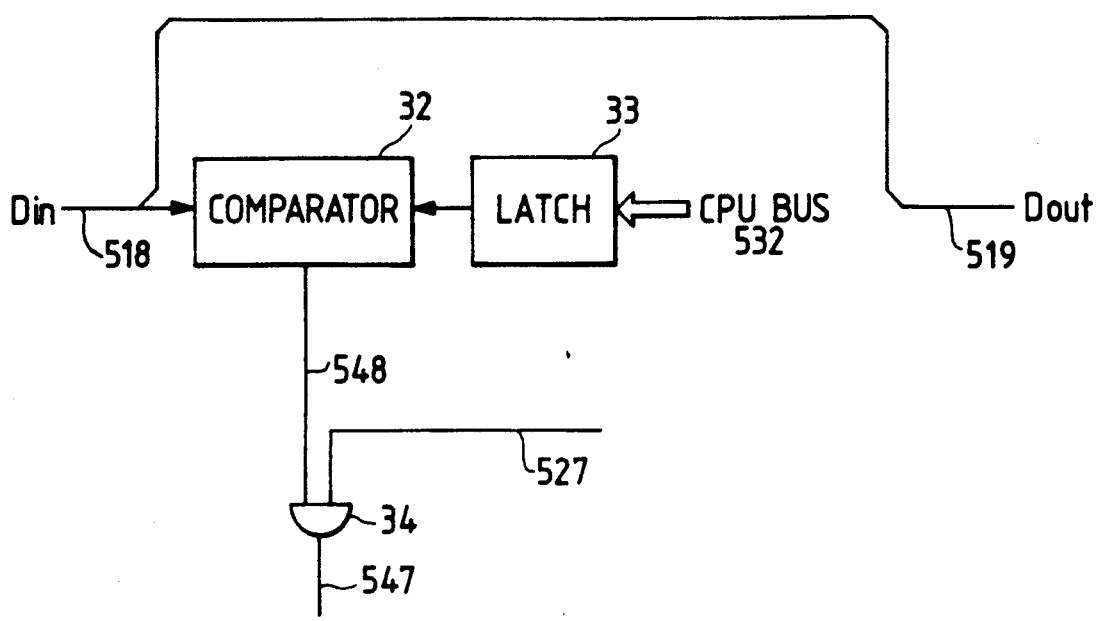
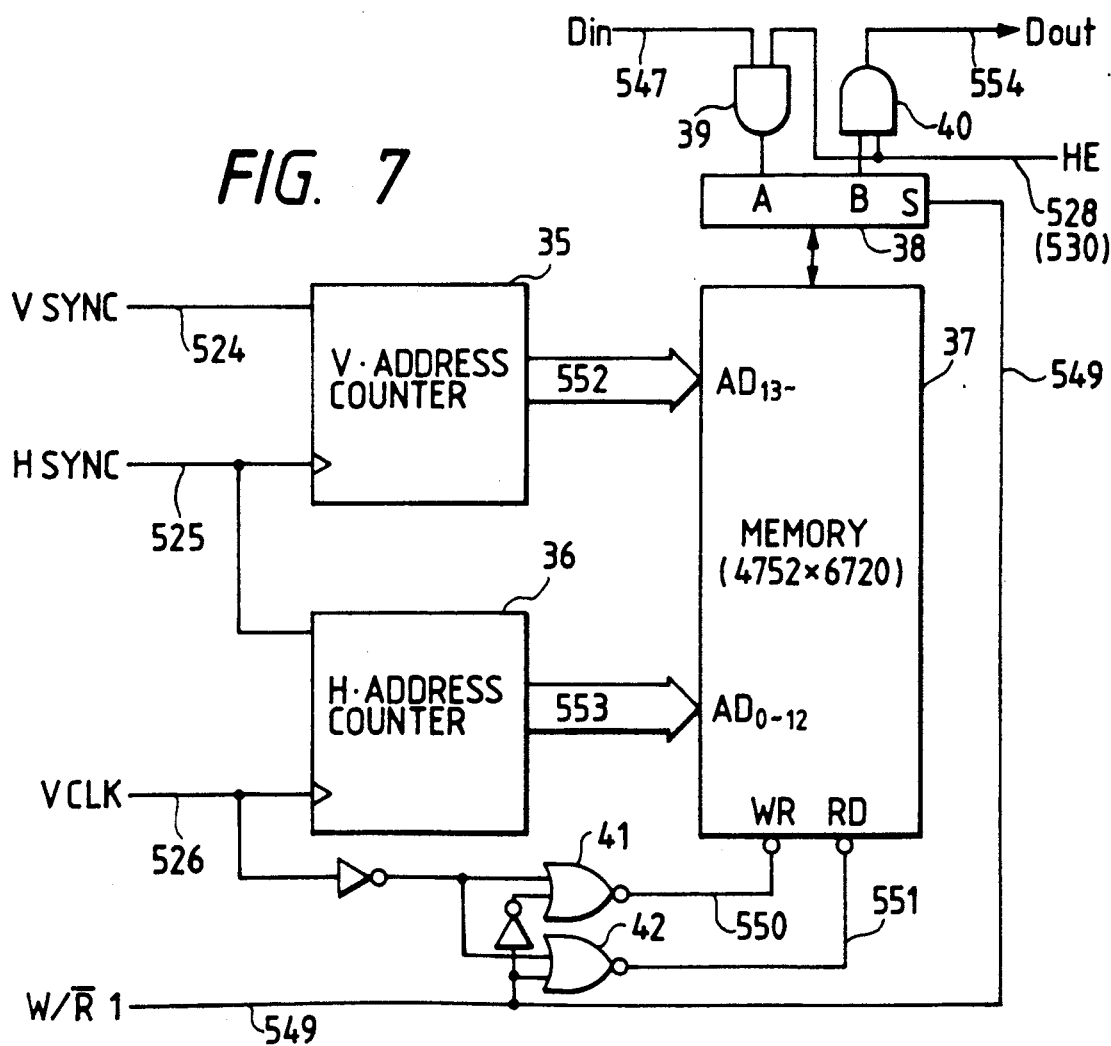

| X₁ | X₀ | J1 | J2 | Y | FIG.11 |
|---|---|---|---|---|---|
| 0 | 0 | X | X | V | (A) |
| 0 | 1 | 0 | X | V | (B) |
|   |   | 0 | X | V |   |
|   |   | 1 | X | A |   |
|   |   | 1 | X | A |   |
| 1 | 0 | 0 | 0 | V | (C) |
|   |   | 0 | 1 | B |   |
|   |   | 1 | 0 | A |   |
|   |   | 1 | 1 | B |   |
| 1 | 1 | 0 | X | C | (D) |
|   |   | 0 | X | C |   |
|   |   | 1 | X | B |   |
|   |   | 1 | X | B |   |

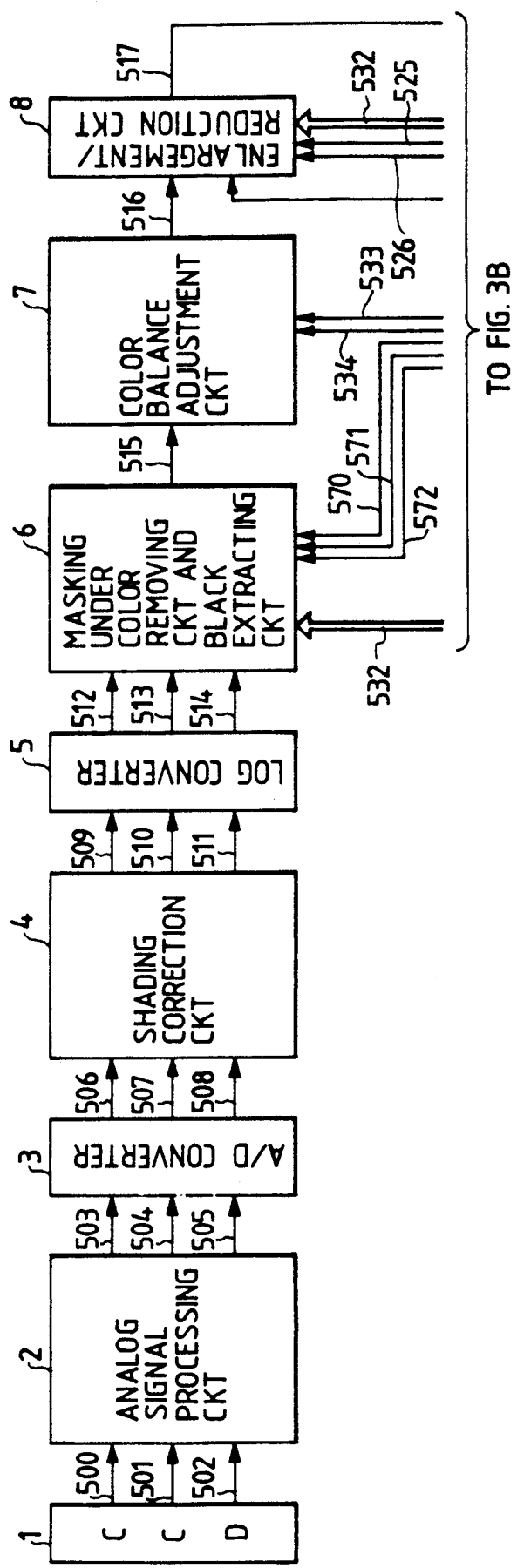

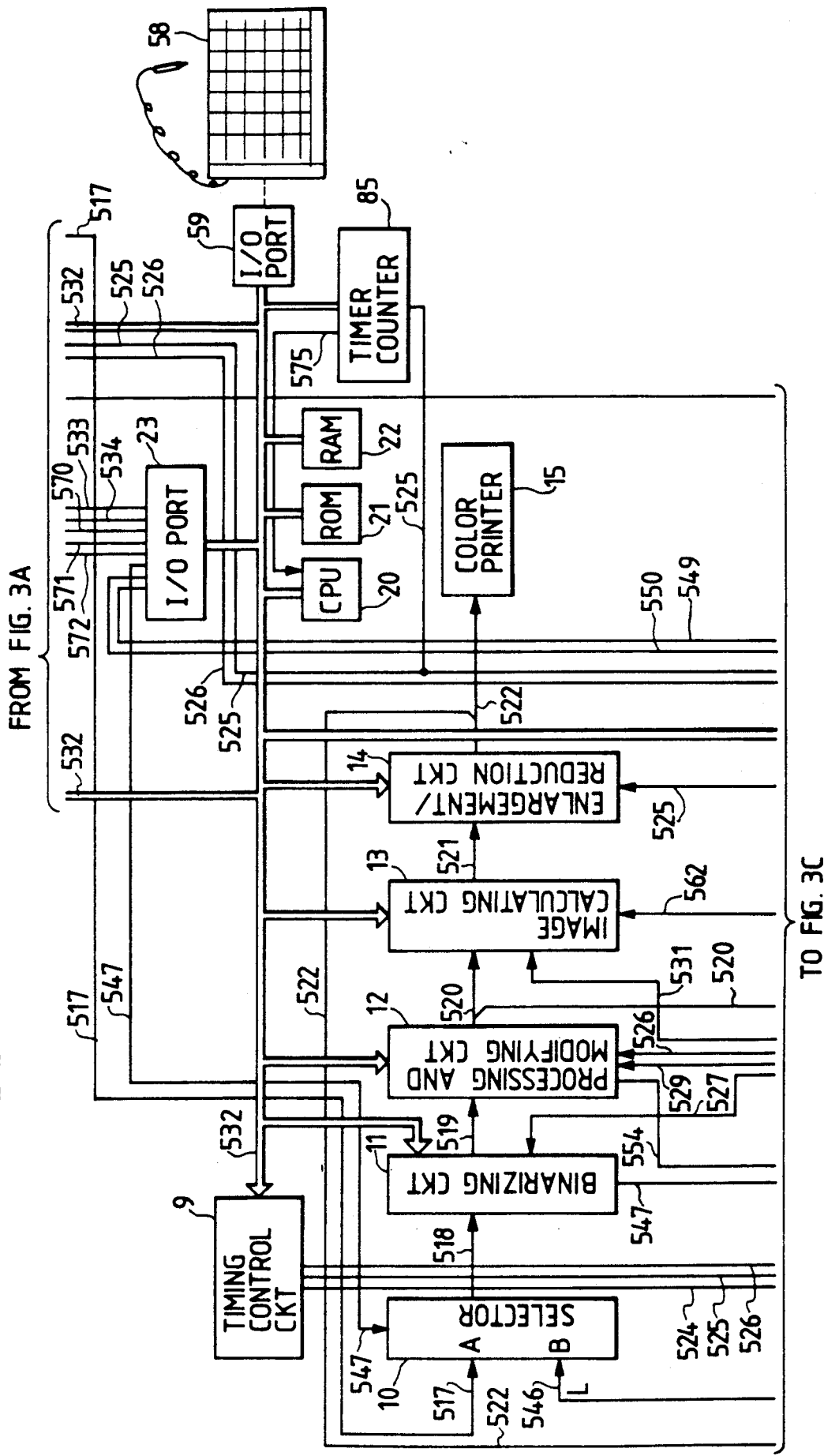

IMAGE PROCESSING APPARATUS AND METHOD

This application is a continuation of application Ser. No. 07/436,065 filed Nov. 14, 1989 now abandoned.

BACKGROUND OF THE INVENTION

1. Field of the Invention

The present invention relates to an image processing apparatus and, more particularly, to an image processing apparatus and method, which can achieve various image edit functions and image modifying functions upon output of an image by digital processing of an input image.

2. Related Background Art

A digital color copying machine has become popular. In this digital copying machine, a color original is color-separated, and the color-separated original data are read in units of pixels. The read image data are subjected to digital processing, and the digital data are output to a color printer to obtain a digital color hard copy. Since a copying machine of this type has an advantage that image data can be digitally processed, various image processing functions are attained. For example, an output position of an image is moved (FIG. 1 1, a desired image area is extracted (FIG. 1 2), a color in only a desired area is changed (FIG. 1 3), and one of two areas on an original table is inserted and synthesized in other area (FIG. 1 4). Thus, an application range of such a copying machine in the field of a so-called color copy is increasingly widened. Therefore, upon combinations of various functions, the digital copying machine can be easily applied to color planning reports, advertising posters, sales promotion samples, graphic designs, and the like. The above-mentioned functions are realized by (1) moving, (2) deleting, (3) changing a color of, and (4) synthesizing a color image in a rectangular area in units of areas, and have become popular. Advertising posters or the like often require further image processing and modifying functions, as shown in FIG. 2. For example, a color image is colored in the form of characters 1, characters are framed 2, and a specific pattern is superposed on a color image to obtain a special effect 3, and so on. In order to obtain these images, a large-scale printing apparatus must be used. Meanwhile, in the printing apparatus, a character plate to be overlaid must be separately formed, and must be overlaid with high precision to perform re-exposure, resulting in cumbersome operations. As a result, considerable cost and time are required. In recent years, an electronic process system or a total scanner system in which a character or photograph plate is electronically scanned and read to be fetched in a computer, and fetched data are displayed on a monitor screen and can be subjected to various edit operations on a memory plane is available. However, such a system is very expensive and large in size, and cannot be adopted in an office, e.g., a small design office. Therefore, such office workers must place an order to a print shop, and cost of image output is considerably increased.

SUMMARY OF THE INVENTION

The present invention has been made in consideration of the above situation, and has as its object to provide an image processing apparatus and method, which can eliminate the conventional problems.

It is an object of the present invention to provide an image processing apparatus which can use various image input apparatuses.

In order to achieve the above objects, according to the present invention, there is disclosed an image processing apparatus comprising:

first and second input means for inputting image data;

memory means for storing first image data input by the first or second input means; and processing means for processing second image data input by the first or second means using the image data stored in the memory means.

It is still another object of the present invention to provide an image processing apparatus which can perform various image processing operations.

In order to achieve this object, according to the present invention, there is disclosed an image processing apparatus comprising:

input means for inputting image data;

variable magnification means for varying a magnification of first image data input by the input means;

synthesizing means for synthesizing the image data output from the variable magnification means and second image data input by the input means; and another variable magnification means for varying a magnification of the output image data from the synthesizing means.

It is still another object of the present invention to provide an image processing apparatus which can perform a special image processing operation.

In order to achieve this object, according to the present invention, there is disclosed an image processing apparatus for digitally processing a color image, comprising:

designation means for designating an area of an image represented by first image data, and synthesizing means for synthesizing second image data in the area designated by the designation means, which is present within the designated area and where the second image data is not present into third image data.

The above and other objects of the present invention will become apparent from the following description of the embodiments and appended claims taken in conjunction with the accompanying drawings.

BRIEF DESCRIPTION OF THE DRAWINGS

FIG. 2 is views for explaining functions as the object of the present invention;

FIGS. 3A, 3B and 3C are a block diagram showing the overall arrangement of the present invention;

FIG. 6 is a circuit diagram for explaining a binarizing circuit;

FIG. 7 is a diagram for explaining a memory circuit;

FIGS. 20A-1 and 20A-2 are flow charts of a copying operation.

DETAILED DESCRIPTION OF THE PREFERRED EMBODIMENTS:

An embodiment of the present invention will be described below with reference to FIGS. 3 to 20A-2.

Figure 3C:
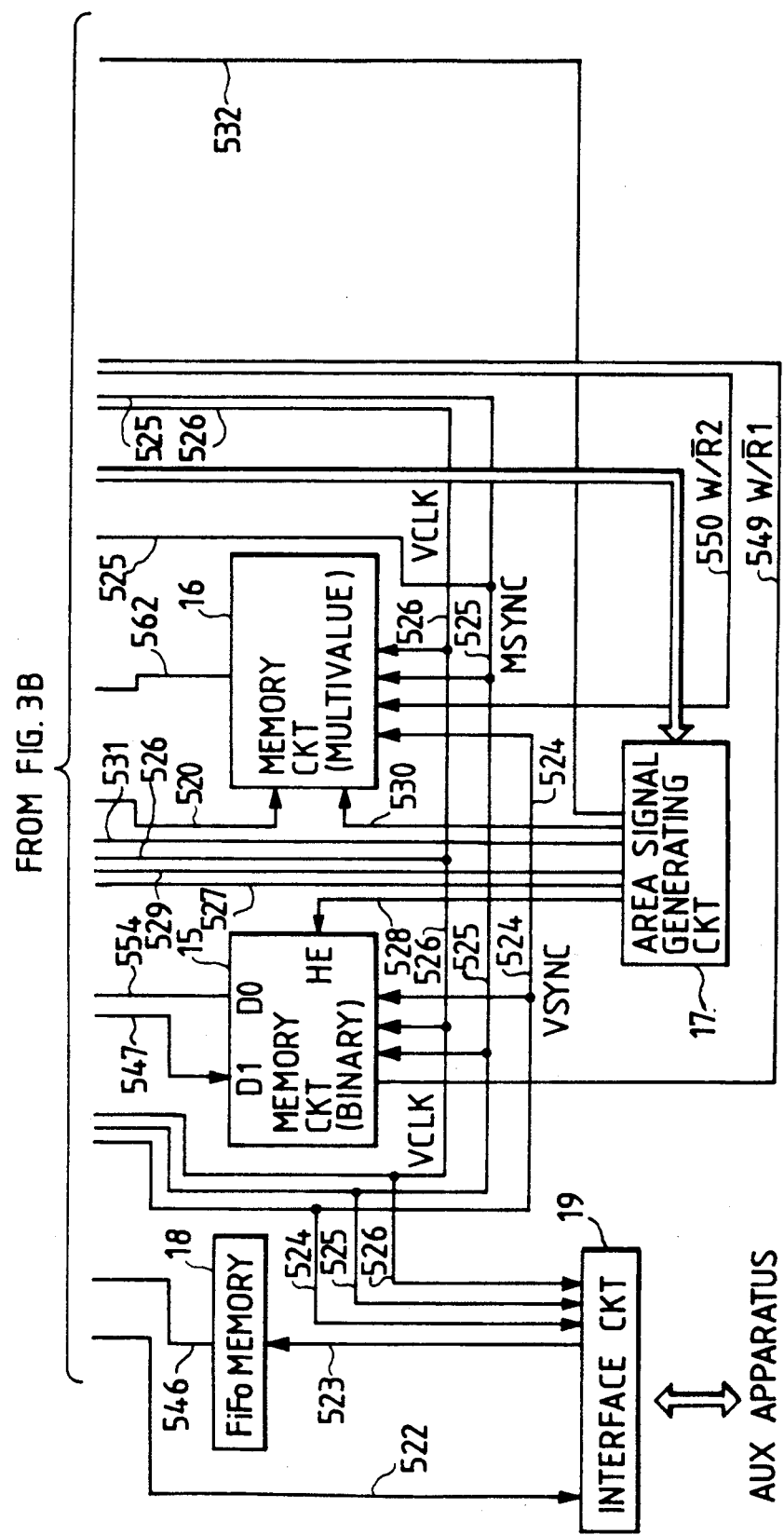

FIG. 3 is a block diagram of a digital color copying machine according to an embodiment of an image processing apparatus of the present invention. A color original on an original table (not shown) to be read by a CCD 1 is color-separated into R (red), G (green), and B (blue) color components. The R, G, and B color components are input to an analog signal processing circuit 2 as analog signals 500, 501, and 502, respectively. The circuit 2 amplifies the input color signals to predetermined levels, and outputs signals 503, 504, and 505 to an A/D converter 3, so that these signals are converted to digital data. A shading correction circuit 4 is a circuit for correcting and uniforming a variation in sensitivity of an optical system and sensors in a reader unit (not shown). Signals 509, 510, and 511 which are subjected to digital level correction in the circuit 4 are input to a masking, under color removing (UCR), and black extracting circuit 6 through a LOG converter 5.

Figures 16A, 16B:
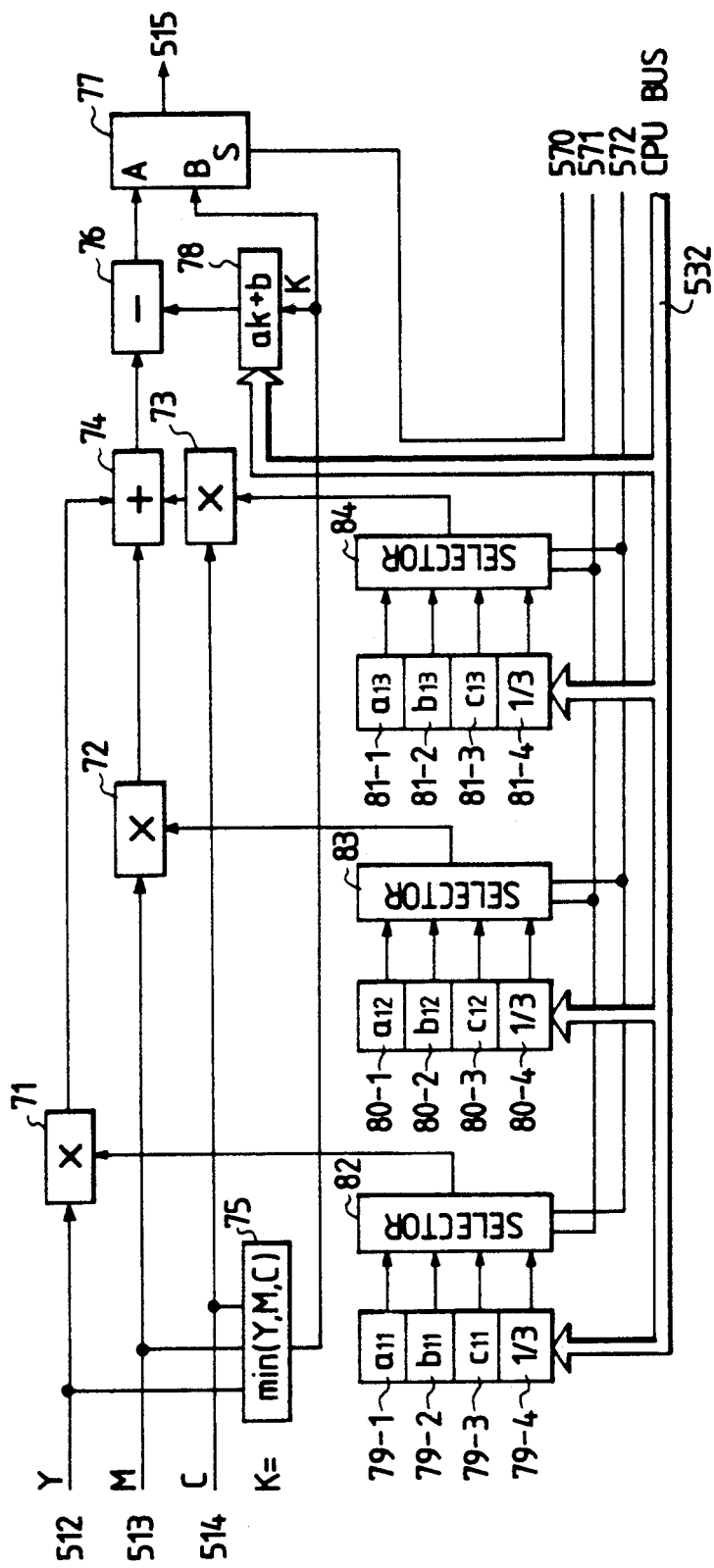
FIGS. 16A and 16B are a circuit diagram and a table for explaining a masking, under color removing, and black extracting circuit.

FIG. 16A is a circuit diagram of the masking, UCR, and black extracting circuit. As is well known, a masking calculation is performed by:

$$\begin{pmatrix} Y_O \\ M_O \\ C_O \end{pmatrix} = \begin{pmatrix} a_{11} & a_{12} & a_{13} \\ b_{11} & b_{12} & b_{13} \\ c_{11} & c_{12} & c_{13} \end{pmatrix} \begin{pmatrix} Y_i \\ M_i \\ C_i \end{pmatrix}$$

Coefficients $a_{11}$ to $a_{13}$, $b_{11}$ to $b_{13}$, and $c_{11}$ to $c_{13}$ are respectively preset in registers 79-1 to 79-4, 80-1 to 80-4, and 81-1 to 81-4 allocated in a CPU 20. The coefficients are selected by signals 570 to 572 from an I/O port 23 in correspondence with a print-out color. For example, when Y is output, (570, 571, 572) = (1, 0, 0) is set. Selectors 82, 83, and 84 respectively select the coefficients $a_{11}$, $a_{12}$, and $a_{13}$. Therefore, $Y_O$ given by the following equation appears at an output 515 in FIG. 16A:

$$Y_O = a_{11}Y + a_{12}M + a_{13}C - (aK + b)$$

(for K = min(Y, M, C))

For a monochrome output, (570, 571, 572) = (1, 1, 1) is set, and a signal MONO given by the following equation is output:

$$MONO = \tfrac{1}{3}Y + \tfrac{1}{3}M + \tfrac{1}{3}C - (aK + b)$$

(a = b = 0 is preferable in the case)

Figure 4:
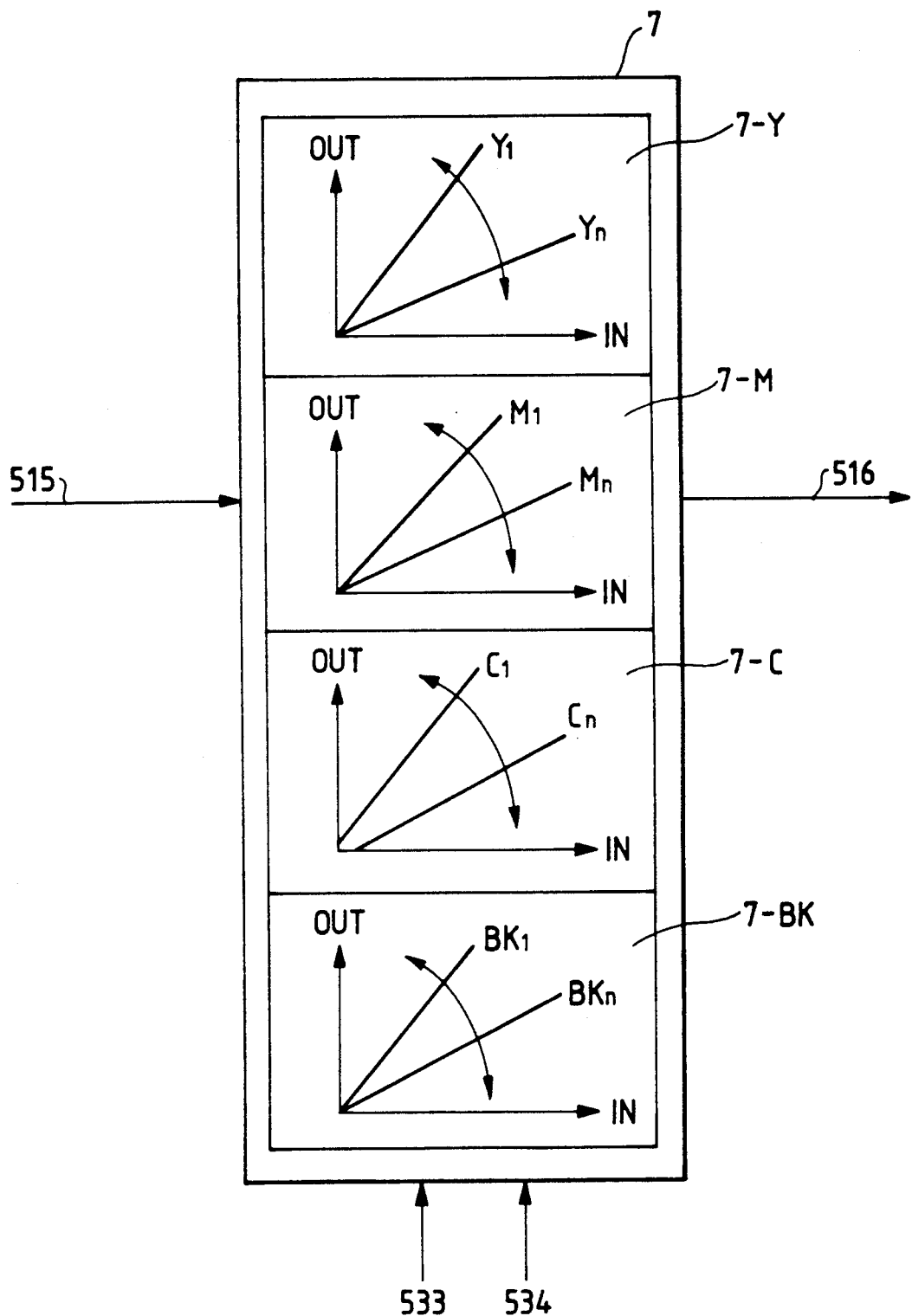
FIG. 4 is a view for explaining a color balance adjustment circuit.

A color balance adjustment circuit 7 can control gradation characteristics of image data corresponding to Y (yellow), M (magenta), C (cyan), and Bk (black) color components, which are frame-sequentially output. As shown in FIG. 4, the circuit 7 comprises LUTs (look-up tables) 7-Y, 7-M, 7-C, and 7-Bk corresponding to the Y, M, C, and Bk components, respectively. The LUTs 7-Y, 7-M, 7-C, and 7-Bk are frame-sequentially switched in response to signals 533 and 534 from the I/O port 23 under the control of the CPU 20. Since each LUT comprises a RAM (random-access memory), data $Y_1$ to $Y_n$, $M_1$ to $M_n$, $C_1$ to $C_n$, and $Bk_1$ to $Bk_n$ can be arbitrarily rewritten by the CPU 20. An enlargement/reduction circuit 14 performs thinning processing and interpolation processing of image data in the main scanning direction of an image, and can also move an image.

Figure 5A:
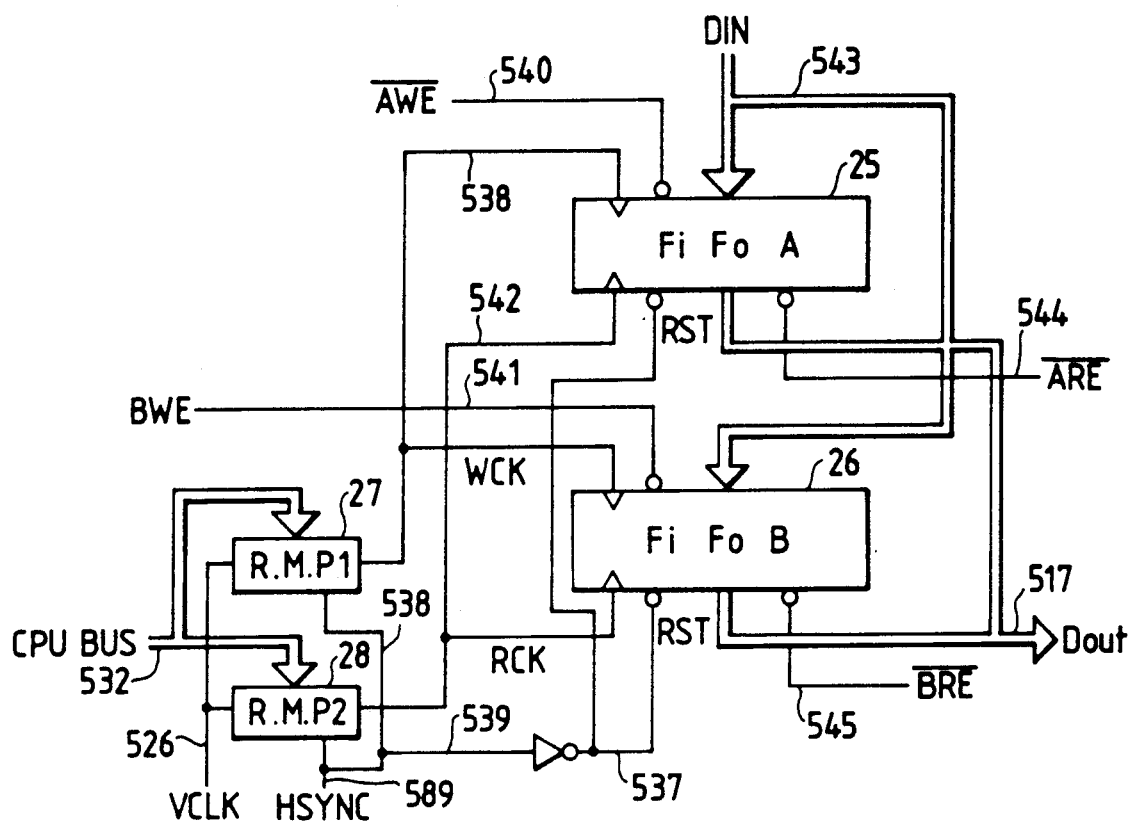
FIGS. 5A to 5G are circuit diagrams and charts for explaining an enlargement/reduction circuit.
Figure 5B:
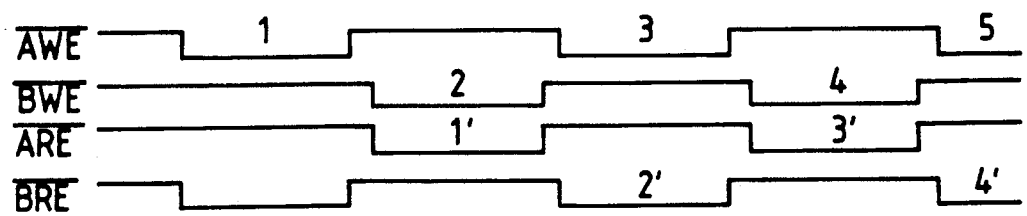
Figure 5C:
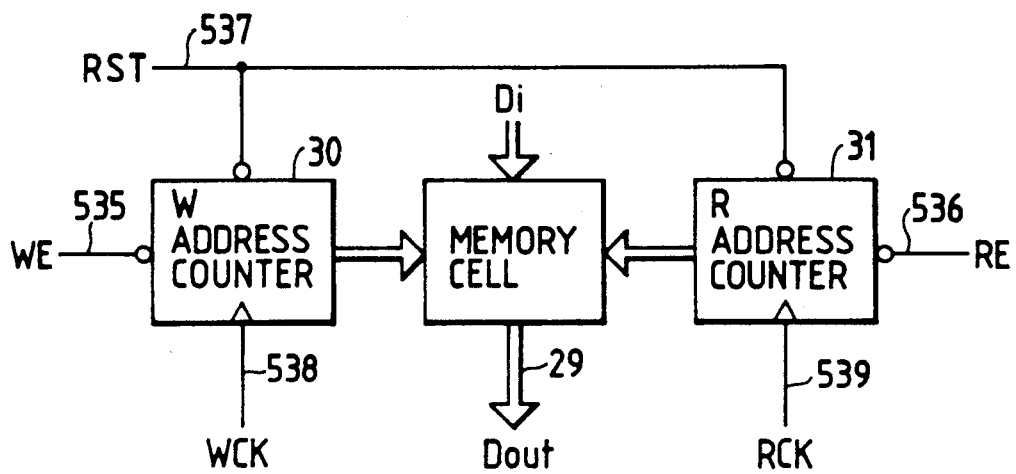
Figure 5D:
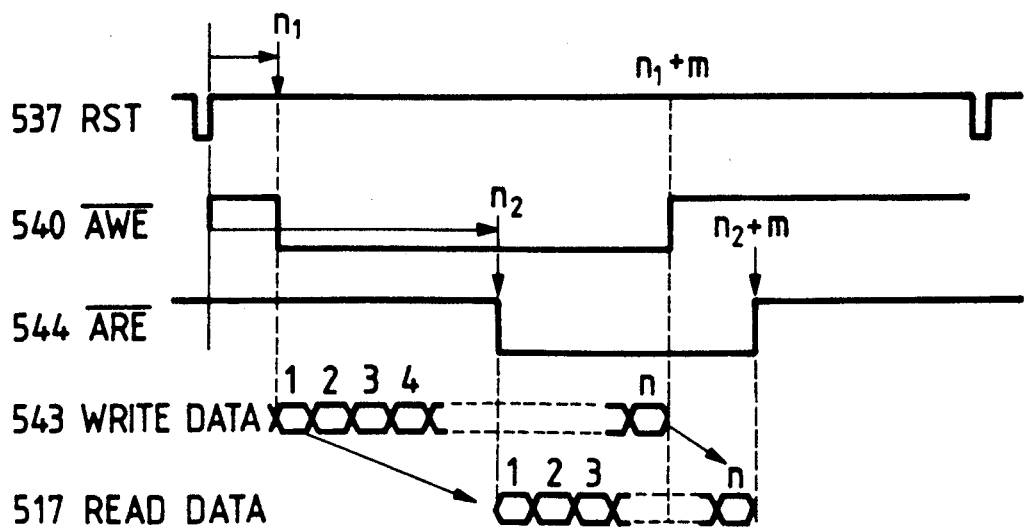
Figure 5E:
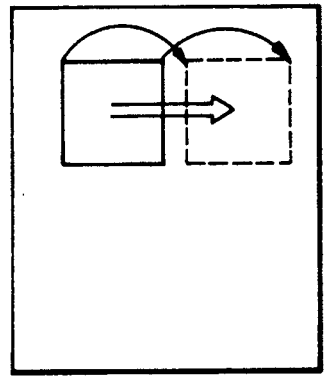
Figure 5F:
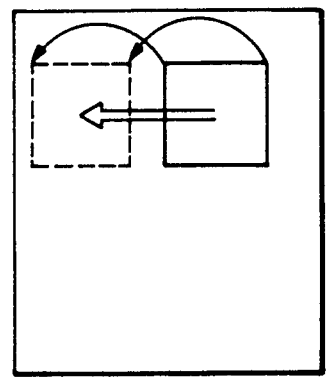
Figure 5G:
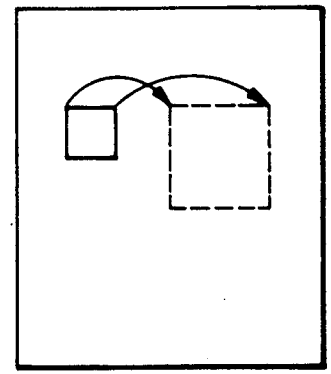

In FIG. 5A, each of FiFo memories 25 and 26 has a memory capacity corresponding to one main-scanning line, e.g., 16 (pels/mm) × 297 (mm: the length of an A4 size sheet) = 4,752 pixels. As shown in FIG. 5B, memory write access is performed during a period of $\overline{AWE}$ or $\overline{BWE}$ = "Lo", and memory read access is performed during a period of $\overline{ARE}$ or $\overline{BRE}$ = "Lo". When $\overline{ARE}$ = "Hi", the output of the memory A is set in a high-impedance state, and when $\overline{BRE}$ = "Hi", the output of the memory B is set in a high-impedance state. Therefore, the outputs from the memories are wired-OR to output data Dout 517. In each of the FiFoA and FiFoB memories 25 and 26, an internal pointer is incremented by write (W) and read (R) address counters 30 and 31 (FIG. 5C) which are operated by clock signals WCK and RCK. As is well known, therefore, when a clock signal CLK from which a video data transfer clock VCLK 526 is thinned by a rate multiplier 27 is input as the clock signal WCK and the clock signal CLK from which no VCLK 526 is thinned is input as the clock signal RCK, data input to this circuit is reduced when it is output. When the clock signals contrary to the above signals are input, input data is enlarged when it is output. Read and write access operations of the FiFoA and FiFoB memories are alternately performed. In each of the FiFo memories 25 and 26, the W and R address counters 30 and 31 update their counts in response to a clock signal during an enable "Lo" interval of enable signals (WE 535 and RE 536), and are initialized when a signal RST (537) = "Lo". As shown in FIG. 5D, after the signal RST (in this embodiment, a main-scanning sync signal $\overline{HSYNC}$ is used), $\overline{AWE}$ = "Lo" (the same applies to $\overline{BWE}$) is set during an interval corresponding to m pixels from an $(n_1)$th pixel to write pixel data, and $\overline{ARE}$ = "Lo" (the same applies to $\overline{BRE}$) is set during an interval corresponding to m pixels from an $(n_2)$th pixel to read out pixel data, so that data are moved like WRITE data→READ data shown in FIG. 5D. In this manner, when generation positions and intervals of the signals $\overline{AWE}$ (and $\overline{BWE}$) and $\overline{ARE}$ (and $\overline{BRE}$) are varied, an image can be arbitrarily moved in the main scanning direction, as shown in FIGS. 5E and 5F. As shown in FIG. 5G, the clock signal WCK or RCK is combined with thinning processing, so that control for varying a magnification of an image and moving the image can be easily realized. The signals $\overline{AWE}$, $\overline{ARE}$, $\overline{BWE}$, and $\overline{BRE}$ input to this circuit are generated by an area signal generating circuit shown in FIG. 14D, as will be described later.

Figure 8:
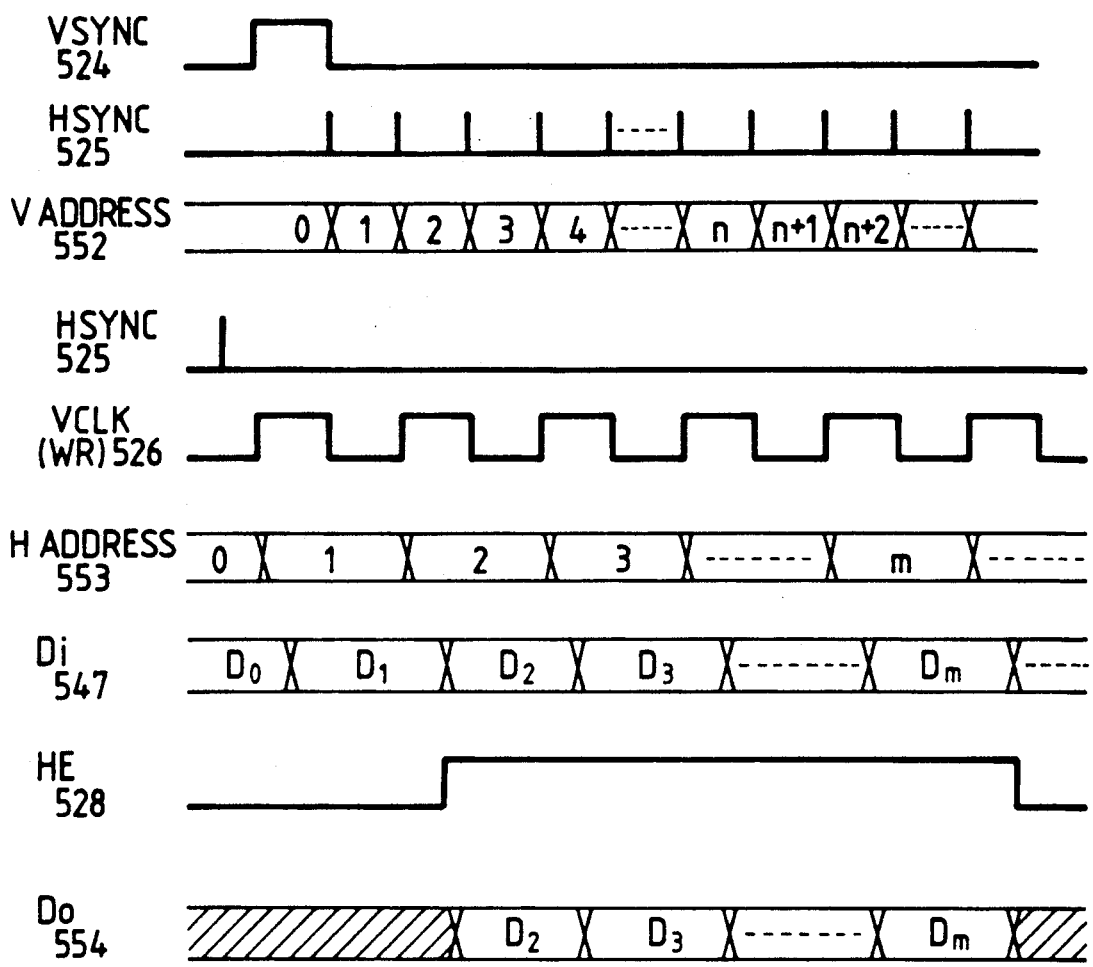
FIG. 8 is a timing chart of the memory circuit.
Figure 9:
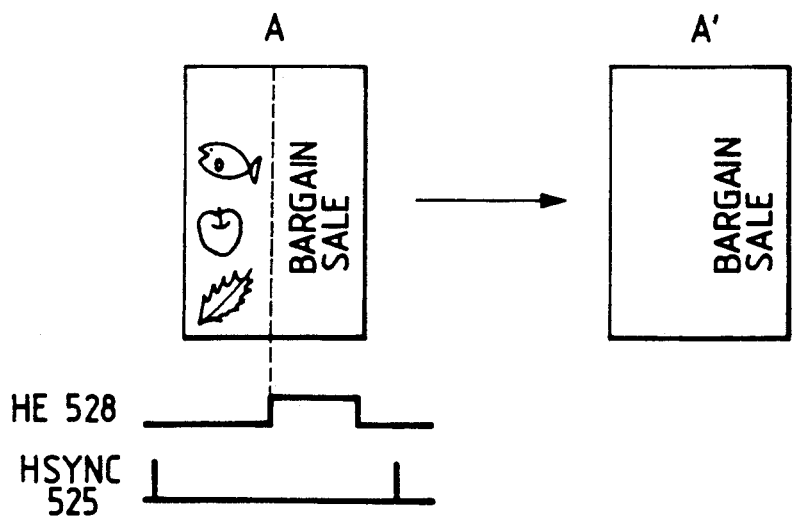
FIG. 9 is a view for explaining the operation of the memory circuit.

An enlargement/reduction circuit 14 has the same arrangement as described above. Color image data 517 output from the enlargement/reduction circuit 8 is input to one input A of a selector 10. The other input B of the selector is connected to the output of a FiFo memory 18 (546). A signal 546 is image data which is input from an external apparatus to the apparatus of this embodiment through an interface circuit 19. When a switching signal 547 is set "Hi", the selector 10 selects the A input; when it is set "Lo", selects the B input, i.e., an external input signal. Then, the selector 10 outputs the selected signal as a selector output 518. The output 518 is input to a binarizing circuit 11, and is binarized. In this case, when a binarization control signal 527 output from an area signal generating circuit 17 is set "Hi", the binarizing circuit 11 binarizes input image data, and supplies a binary output 547 to a memory circuit 15; when the signal 527 is set at "Lo", the binary output 547 is kept "Lo", and no binary signal is output to the memory circuit. FIG. 6 shows the binarizing circuit 11 in detail. The image input 518 is directly output as output data 519, and is also input to an input terminal of a comparator 32. The data input to the comparator 32 is compared with a numerical value (slice level) set in a programmable latch 33 by the CPU 20, thus outputting a binary output 548. The output 548 is ANDed with the signal 527 in an AND gate 34. Therefore, as described above, only when the area signal 527 is set "Hi", a binary output is validated. The memory circuit 15 will be described below. The memory circuit 15 stores the binary signal 547 for one page of an image. Since the apparatus of this embodiment processes an A3-sized image at 16 pels/mm, the memory circuit 15 has a capacity of 32 Mbits. FIG. 7 shows the memory circuit in detail. Note that a multivalue memory circuit 16 has substantially the same arrangement as that of the memory circuit 16 except that input data $D_{IN}$ and output data $D_{OUT}$ are multibit data, and a main-scanning data enable signal HE is replaced with a signal 530. Therefore, the following description also applies to the memory circuit 16. Input data $D_{IN}$ 547 is gated by an enable signal HE 528 in a memory write mode, and is input to a memory 37 when a W/$\overline{R}$ 1 output of the I/O port 23 controlled by the CPU 20 is set "Hi" in the write mode. At the same time, addresses corresponding to a storage operation of image data are generated by a V address counter 35 for counting main-scanning (horizontal scanning) sync signals HSYNC 525 in response to the vertical sync signals VSYNC 524 of an image to generate vertical addresses, and an H address counter 36 for counting transfer clock signals VCLK 526 in response to the signals HSYNC 525 to count horizontal addresses. In this case, for a memory WR input (write timing signal) 550, a clock signal in phase with the clock signal VCLK 526 is input as a strobe signal, and input data Di are sequentially stored in the memory 37 (FIG. 8). When data are read out from the memory 37, the control signal W/$\overline{R}$ 1 is set "Lo", so that output data $D_{OUT}$ can be read out in the same manner as described above. Note that both the data write and read access operations are performed in response to the signal HE 528. For example, when the signal HE 528 is set "Hi" at an input timing of data $D_2$ and is set "Lo" at an input timing of data $D_m$, as shown in FIG. 8, only image data $D_2$ to $D_m$ are input to the memory 37, and data $D_0$ and $D_1$ and data $D_{m+1}$ and thereafter are not written but data "0" are written instead. The same applies to read access. That is, data "0" is read out during a period other than an "Hi" interval of the signal HE. The signal HE is output from the area signal generating circuit 17 (to be described later). For example, when a character original A shown in FIG. 9 is placed on an original table, if the signal HE is generated as shown in FIG. 9 in write access of binary signals, a binary image of only a character portion can be written in the memory, as indicated by A' in FIG. 9. Similarly, image data can be written in the memory while deleting unnecessary characters.

Figure 10A:
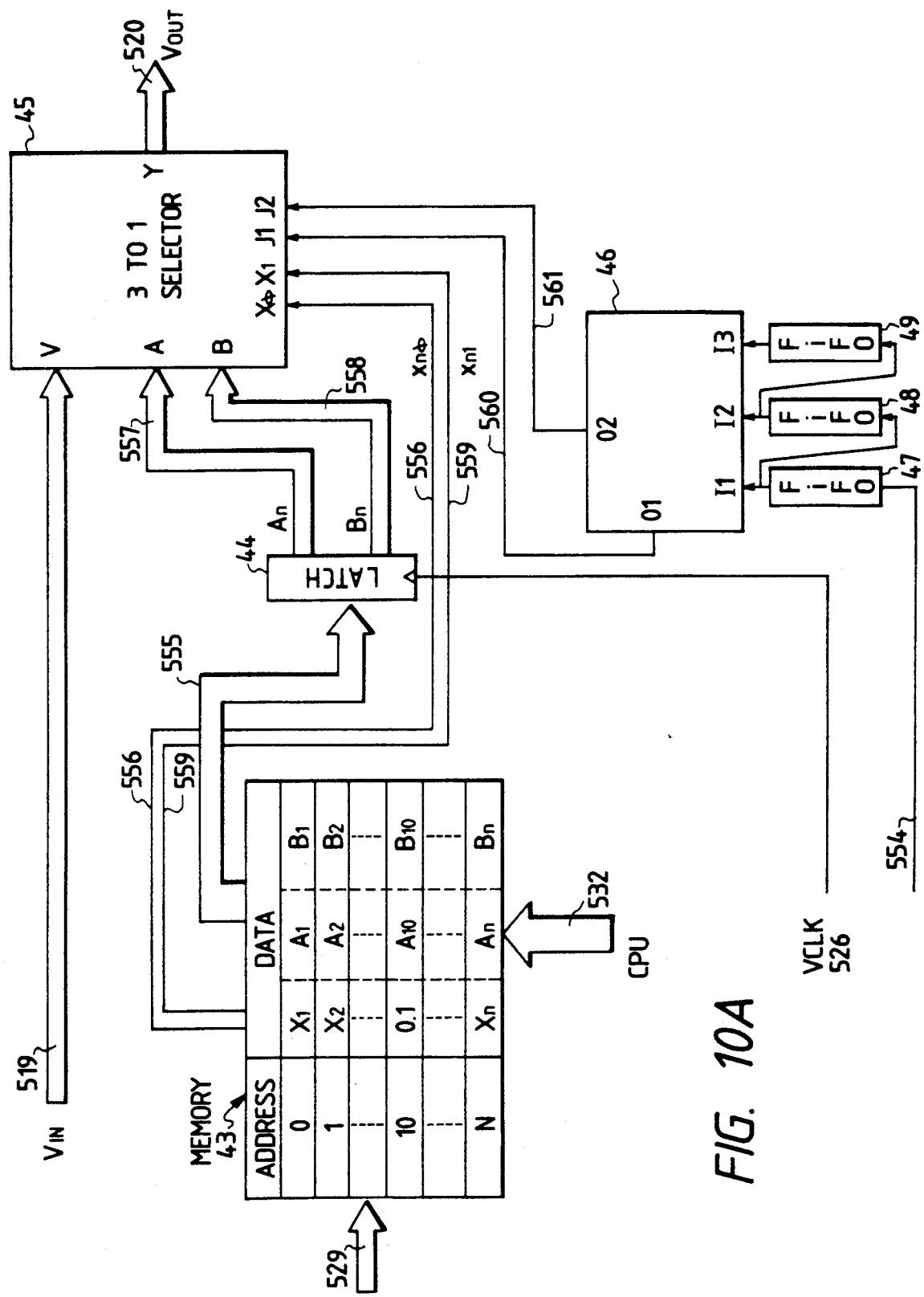
FIGS. 10A to 10C are circuit diagrams and a table for explaining a processing and modifying circuit.
Figures 10B, 10C:
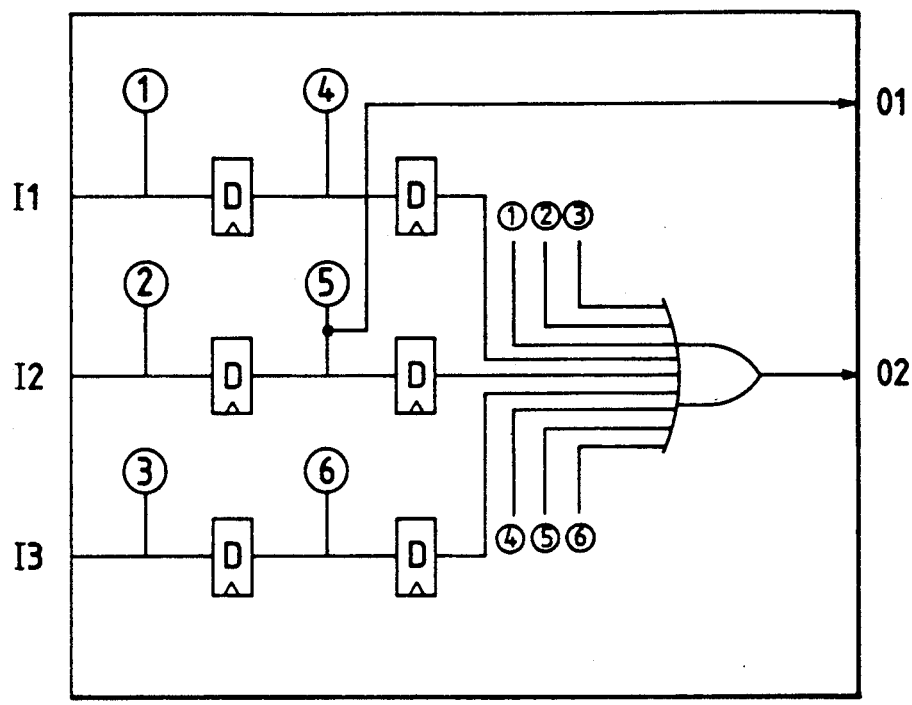
Figure 11B:
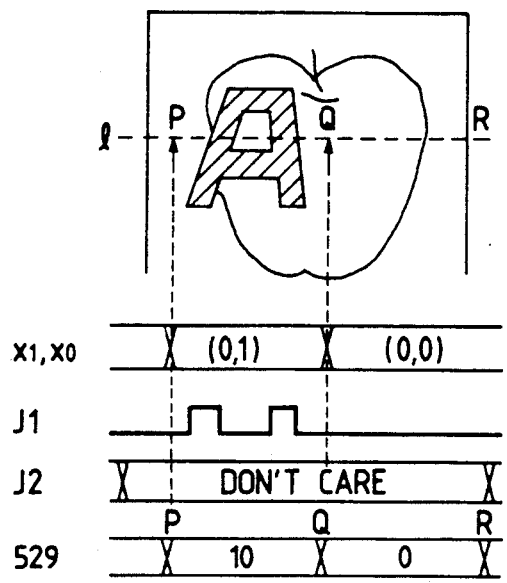
FIGS. 11A to 11D are views for explaining the functions of the present invention.
Figure 11C:
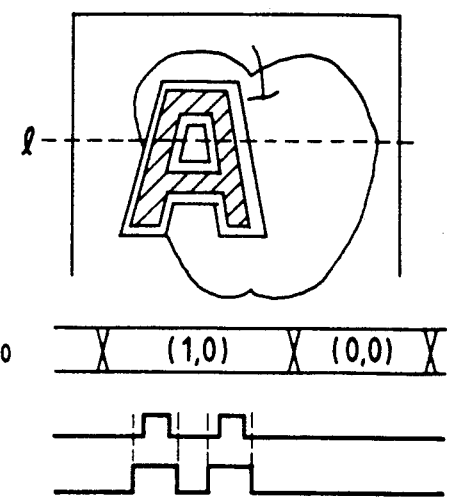
Figure 11D:
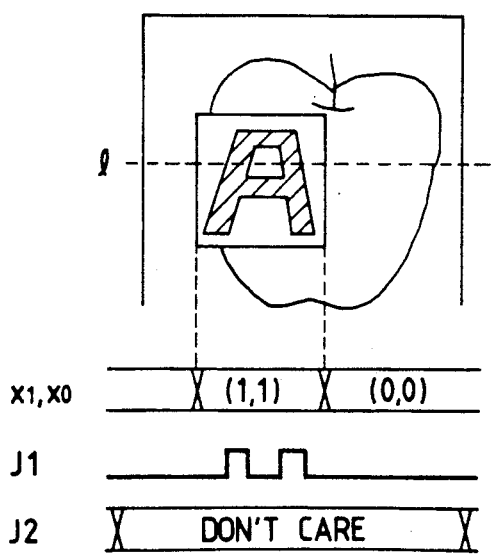
Figure 11A:
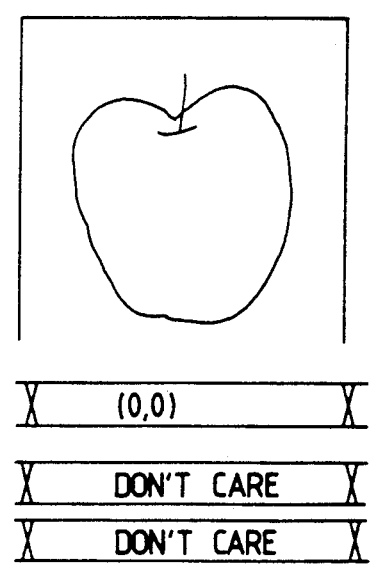

A processing and modifying circuit 12 will be described below. FIG. 10A is a block diagram of the processing and modifying circuit using binary image signals in the apparatus of this embodiment. Color image data 519 input from an image data input unit are input to a V input terminal of a 3-to-1 selector 45. $A_n$ of a lower-bit portion ($A_n$, $B_n$) 555 of data read out from a memory 43 is input to the input terminal A of the 3-to-1 selector 45, and $B_n$ is input to the input terminal B after they are latched by a latch 44 in response to the clock signal VCLK 526. Therefore, one of data V, A, and B is output to an output terminal Y of the selector 45 on the basis of select inputs $X_0$, $X_1$, J1, and J2 (520). Data $X_n$ is upper 2 bits of data in the memory, and serves as a mode signal for determining one of processing and modifying modes. A code signal 529 is output from the area signal generating circuit 17, and is switched in synchronism with the clock signal VCLK 526 under the control of the CPU 20 to be input to the memory 43 as an address signal. More specifically, when ($X_{10}$, $A_{10}$, $B_{10}$)=(01, $A_{10}$, $B_{10}$) is written in advance at, e.g., an address "10" of the memory 43, and data "10" is assigned to the code signal 529 between points P and Q and data "0" is assigned thereto between points Q and R in synchronism with scanning of a main-scanning line 1, as shown in FIG. 11B, data $X_n$=(0, 1) is read out, and data ($A_{10}$, $B_{10}$) is latched and output as ($A_n$, $B_n$) during a period between P and Q. FIG. 10C shows a truth table of the 3-to-1 selector 45. As shown in FIG. 10C, ($X_1$, $X_0$)=(0, 1) corresponds to a case (A). If J1="1", the A input can be output to an output terminal Y, i.e., the constant $A_{10}$ can be output to the output terminal Y; when J1="0", the V input can be output to the output terminal Y, i.e., input color image data can be output to an output terminal 520. In this manner, so-called butt-to-line character synthesis of a character portion having a value ($A_{10}$) with respect to a color image of an apple can be realized, as shown in FIG. 11B. Similarly, when ($X_1$, $X_0$)=(1, 0) is set and a signal J1 shown in FIG. 11C is input as a binary input 554, a signal J2 shown in FIG. 11C is generated by FiFo memories 47 to 49 and a circuit 46 (FIG. 10B) (color window processing). According to the truth table shown in FIG. 10C, a framed character is output in an image of an apple, as shown in FIG. 11C (framed character processing). Similarly, in FIG. 11D, a rectangular area in an apple is output at a density of ($B_n$), and a character is output at a density of ($A_n$). FIG. 11A shows a case of ($X_1$, $X_0$)=(0, 0), i.e., control wherein no processing is performed by binary signals for any changes in signals J1 and J2.

The pulse width of the signal J2 is extended by 3×3 pixels, as shown in FIG. 10B. When a hardware circuit is added, an extended width can be easily increased.

Figure 12:
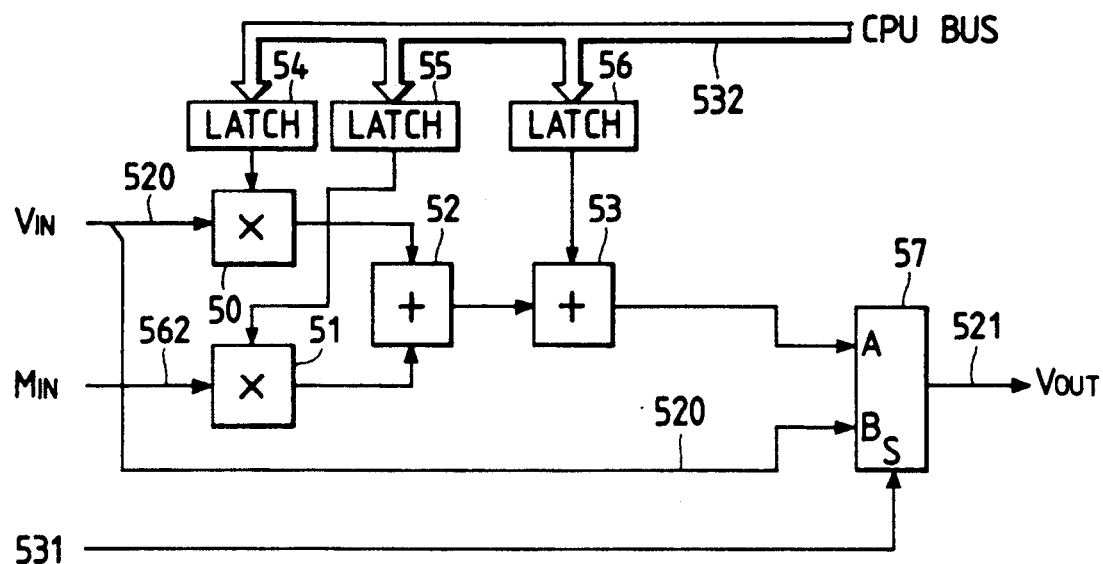
FIG. 12 is a circuit diagram of an image calculating circuit.

FIG. 12 shows an image calculating circuit 13. The circuit 13 receives an image data input 520 $V_{IN}$, and data $M_{IN}$ 562 read out from the multivalue memory circuit 16. Assuming that $\alpha$, $\beta$, and $\gamma$ are respectively set in coefficient latch data 54, 55, and 56 by a CPU bus 532, when a signal 531 is set "Hi", the A input of a selector 57, i.e., $V_{OUT}$ given by the following equation is output:

$$V_{OUT} = \alpha V_{IN} + \beta M_{IN} + \gamma$$

Figure 13A:
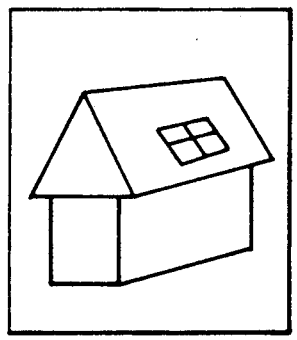
FIGS. 13A to 13C are views for explaining the image calculating circuit.
Figure 13B:
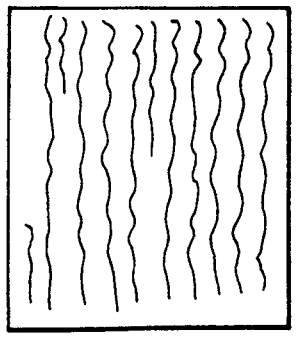
Figure 13C:
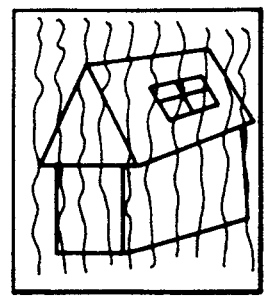

On the other hand, when the signal 531 is set "Lo", the B input, i.e., the input data $V_{IN}$ 520 is directly output (since the operation of the memory circuit 16 has already been described above with reference to FIG. 7, a description thereof will be omitted here). Therefore, for example, a pattern shown in FIG. 13B is written in advance in the memory circuit 16 from the original table or through the interface circuit 19→the FiFo memories, and an original as shown in FIG. 13A is placed on the original table. Then, when an image is output while the signal 531 is set "Hi", an image with a texture can be obtained.

In this manner, since the multivalue memory circuit 16 is arranged in addition to the binary memory circuit 15, a user can enjoy a variety of image processing operations. In addition, various image calculations are available, e.g., a texture effect obtained by density modulation, synthesis of multivalue image data to a portion of an image, and the like.

Figure 14E:
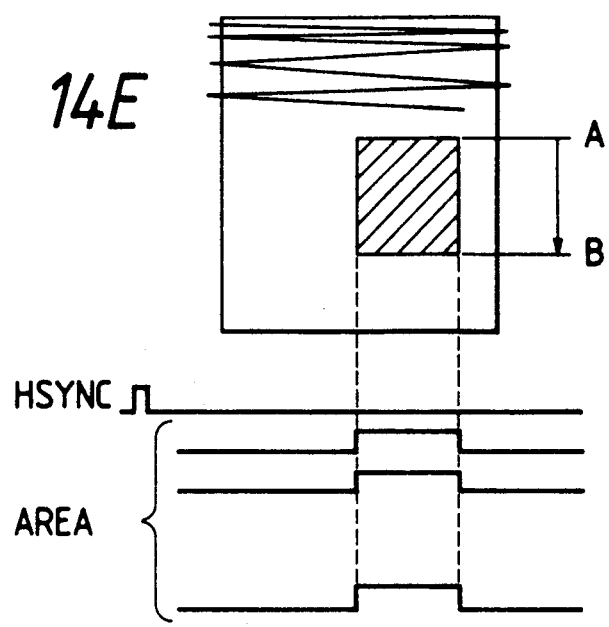
FIGS. 14A to 14F are charts and a circuit diagram for explaining an area signal generating circuit.
Figure 14F:
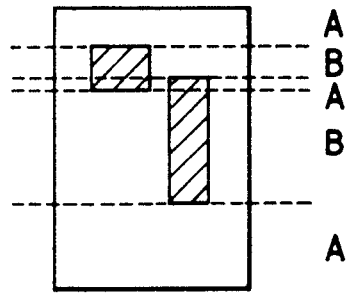
Figure 15:
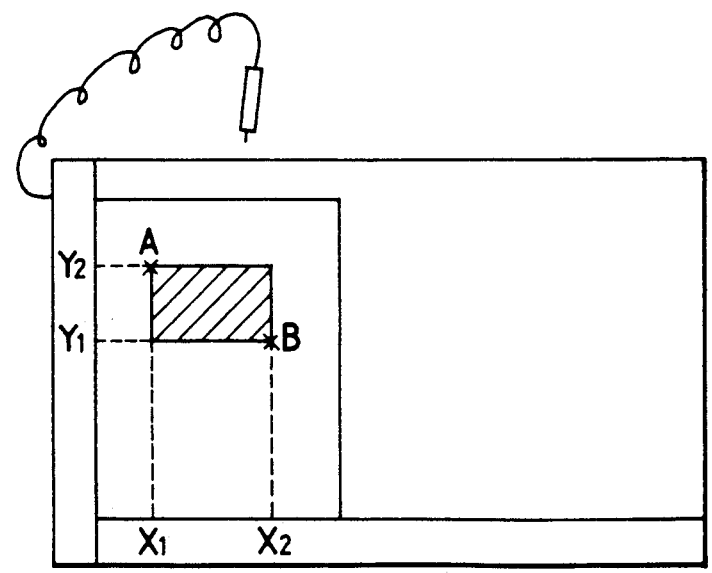
FIG. 15 is a plan view for explaining a digitizer.
Figure 14A:
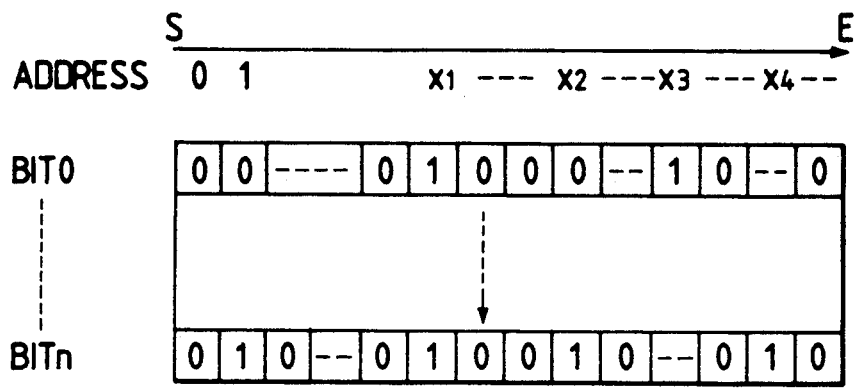
Figure 14B:
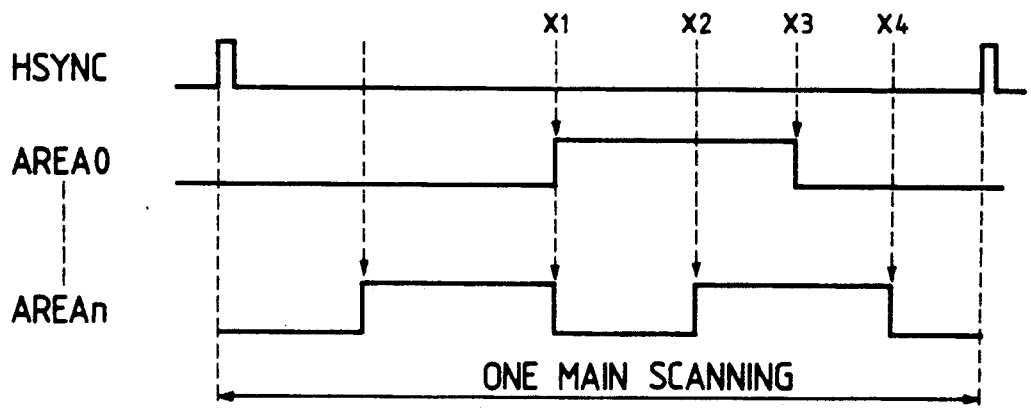
Figure 14C:
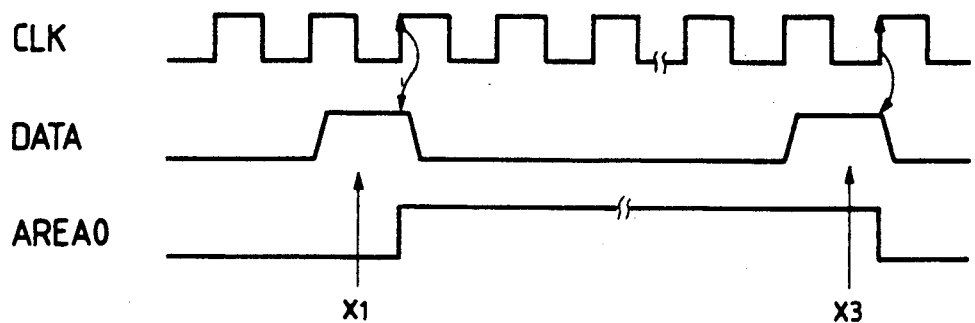
Figure 14D:
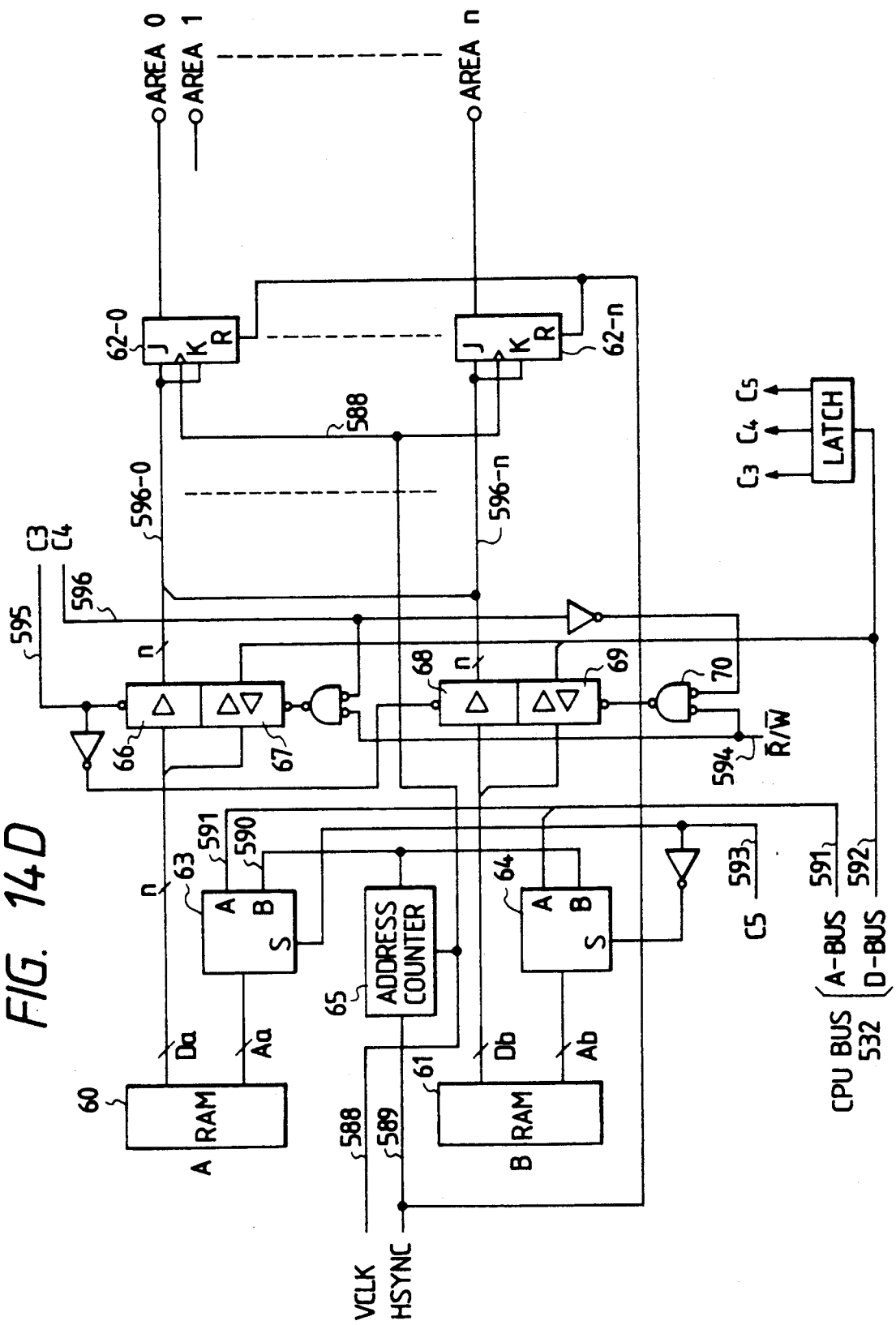

FIGS. 14A to 14F are views for explaining the area signal generating circuit 17. An "area" indicates a hatched portion as shown in FIG. 14E, and is distinguished from other areas by, e.g., a signal AREA shown in the timing chart of FIG. 14E for every interval A→B in the sub-scanning direction and for every line. Each area is designated by a digitizer 58 shown in FIG. 3. FIGS. 14A to 14D show an arrangement capable of obtaining a large number of area signals with a programmable generation position, duration of an interval, and number of intervals by the CPU 20. This arrangement includes two n-bit RAMs (60 and 61 in FIG. 14D) to obtain, e.g., n area signals AREA0 to AREAn so that one area signal is generated by one bit of a RAM which can be accessed by the CPU. In order to obtain the area signals AREA0 and AREAn shown in FIG. 14B, data "1" is set at bits "0" of addresses $x_1$ and $x_3$ of the RAM, and data "0" are set at bits "0" of the remaining addresses. On the other hand, data "1" is set at bits "n" of address "1", $x_1$, $x_2$, and $x_4$, and data "0" is set at bits "n" of the remaining addresses. When data in the RAM are sequentially read out in synchronism with a given clock with reference to the signal HSYNC, data "1" is read out at addresses $x_1$ and $x_3$, as shown in FIG. 14C. Since the readout data is input to both the J and K terminals of J-K flip-flops 62-0 to 62-n, the output of each flip-flop changes from "0" to "1" and vice versa when a toggle operation is performed, i.e., when data "1" is read out from the RAM and a signal CLK is input, and an interval signal like AREA0, i.e., an area signal is generated. When data = "0" is set for all the addresses, no area interval is generated, and no area is set. FIG. 14D is a circuit diagram of this arrangement including the RAMs 60 and 61 described above. In order to switch the area interval at high speed, memory write access for setting different areas is performed for the RAM B 61 by the CPU 20 (FIG. 3) while data read access is performed for the RAM A 60 in units of lines. In this manner, generation of intervals and memory write access from the CPU are alternately switched. Therefore, when a hatched area shown in FIG. 14F is designated, RAMs A and B are switched like A→B→A→B→A. If ($C_3$, $C_4$, $C_5$) = (0, 1, 0) is set in FIG. 14D, a counter output counted in response to the signal VCLK is supplied as an address to the RAM A 60 through a selector 63 (Aa) to enable a gate 66 and to disable a gate 68, thus reading out data from the RAM A 60. The readout n-bit data having a total bit width are input to the J-K flip-flops 62-0 to 62-n, thus generating interval signals AREA0 to AREAn in accordance with preset values. Data write access to the RAM B from the CPU is performed by an address bus A-Bus, a data bus D-Bus, and an access signal $\overline{R/W}$ during this interval. Contrary to this, when interval signals are to be generated based on data set in the RAM B 61, ($C_3$, $C_4$, $C_5$) = (1, 0, 1) can be set to perform the same operation. Thus, data write access from the CPU to the RAM A 60 can be performed.

The digitizer 58 is used to designate an area, and inputs a coordinate position designated from the CPU 20 through the I/O port. For example, when two points A and B are designated in FIG. 15, coordinates of A ($X_1$, $Y_2$), and B ($X_2$, $Y_1$) are input.

Figure 17A:
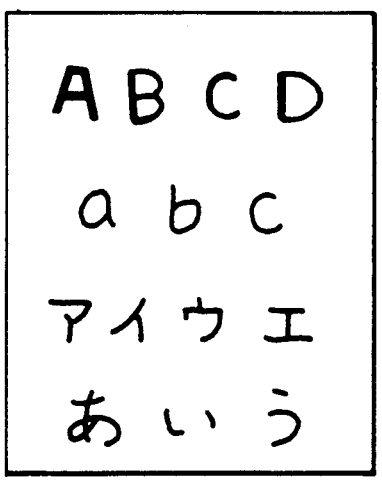
FIGS. 17A to 17C are views for explaining the operation of the present invention.
Figure 17B:
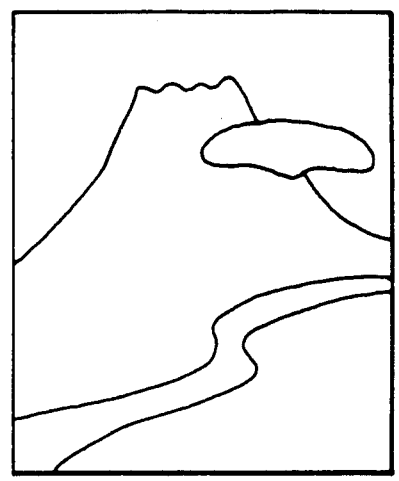
Figure 17C:
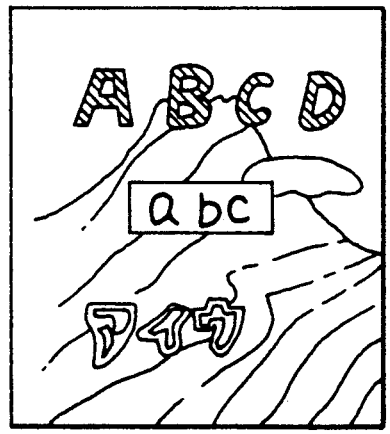

Control for obtaining an image edited and processed as shown in FIG. 17C from a character original shown in FIG. 17A and a color original shown in FIG. 17B will be described below.

Figure 18:
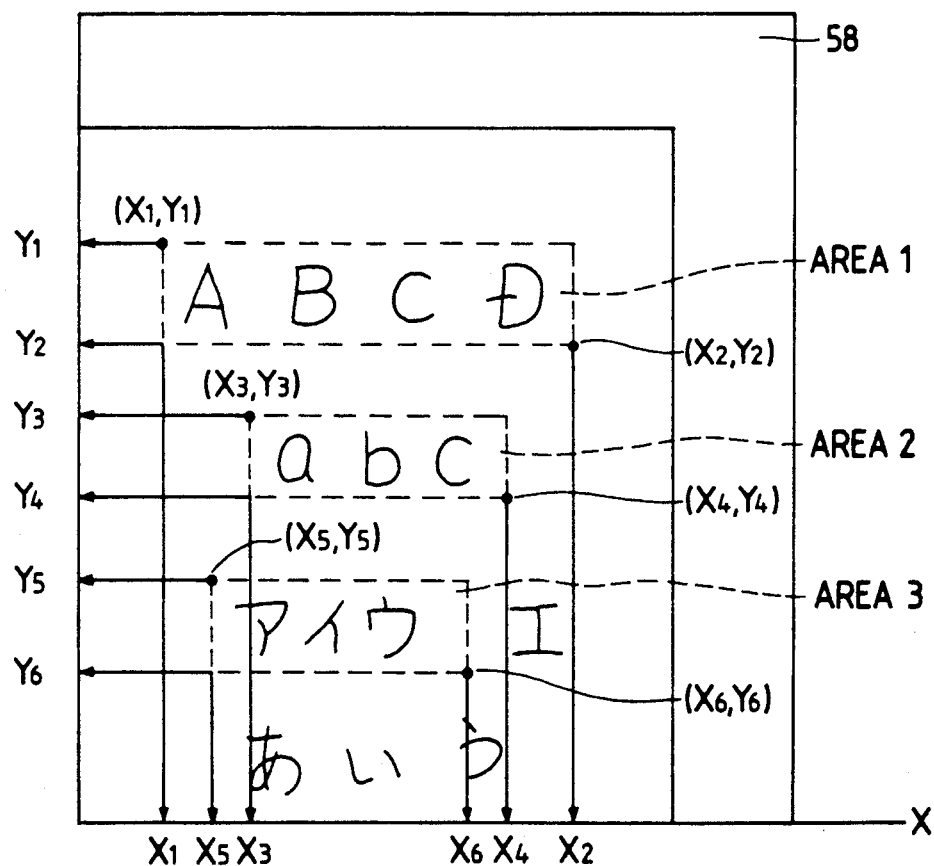
FIG. 18 is a view for explaining area designation.

An original shown in FIG. 17A is placed on the digitizer 58, and a desired area is input. More specifically, when six positions ($X_1$, $Y_1$) to ($X_6$, $Y_6$) are designated, as shown in FIG. 18, the CPU 20 inputs the corresponding coordinates from an I/O port 59, and stores them in a RAM 22 (S1 and S2). A processing mode is set for areas ("1" to "3"). Referring to FIG. 11, in this case, area "1" = B mode, area "2" = D mode, and area "3" = C mode. The modes are set by an operation panel (not shown (S3 to S5). Thereafter, a character original is placed on the original table, and a read operation is started. This operation may be started by using a copy button. The CPU 20 sets a line count corresponding to $Y_1$ for a timer counter 85, and the timer is started. Thus, when a sub-scanning operation reaches the position of $Y_1$, an interrupt signal 575 is generated for the CPU 20. At this time, $X_1$ and $X_2$ are set in memories (RAMs) 60 and 61 shown in FIG. 14 so that the area signal generating circuit 17 generates a signal 527 for enabling binarization, and a signal HE 528 for enabling write access to the memory, as shown in FIGS. 8 and 9. The signals are kept set until the counter completes counting of the number of lines corresponding to a count value ($Y_2 - Y_1$). After count-up of the counter, the counter is reset (S7 to S11). Steps S7 to S11 are repeated for the respective areas, so that a desired binary image is stored in the memory 37 (FIG. 7). Thereafter, binary image data which is stored until power-off of the apparatus is then used for character processing and modifying operations of a color image. An original shown in FIG. 17B is placed on the original table, and a copying operation is started. In the present modes, for example, the area "1" is subjected to butt-to-line processing with a character color of Y (yellow); the area "2", white rectangular frame processing with a character color of M (magenta); and the area "3", white frame processing with a character color of C (cyan). In this case, if addresses "1", "2", and "3" are respectively assigned to the areas "1", "2", and "3", the address "1" is controlled to write $X_2 = (0, 1)$, $A_2 = 255$ (maximum density), and $B_2 = $ an arbitrary value during output of a yellow image or $A_2 = 0$ (white) and $B_2 = $ an arbitrary value during output of other colors; the address "2", $X_3 = (1, 1)$, $A_3 = 255$ (maximum density), and $B_3 = 0$ (white) during output of a magenta image, or $A_3 = B_3 = 0$ (white) during output of other colors; the address "3", $X_4=(1, 0)$, $A_4=255$ (maximum density), and $B_4=0$ (white) during output of a cyan image, or $A_4=B_4=0$ (white) during output of other colors in units of colors. More specifically, when a copy key is ON (S10), yellow image formation is started. In this case, predetermined modes are set for the areas "1" to "3", and data is set in the RAMs 60 and 61 so that "1" is input as an address of a memory during an interval from position $X_1$ to $X_2$ in the main scanning direction by the area generating circuit 17 when a scanning operation reaches $Y_1$ (S17). Similarly, data are sequentially set in the memories so that predetermined codes "0", "2", and "3" are generated at the positions of $Y_2$ to $Y_6$ (S18 to S26). When the scanning operation is completed, magenta image formation is started. In step S28, data for magenta are set for the area "2", and the same operations as in yellow image formation are repeated in steps S15 to S26 until the magenta image formation is completed in step S29. Similarly, a cyan image is formed in steps S31 and S32, and a black image is formed in steps S34 and S35, thus completing output of one color image. In this embodiment, a character is painted in a single color, and a frame is in white. However, any color can be realized by changing data set in $A_n$ and $B_n$ in the memory 43. Image data input from an external device in synchronism with the vertical sync signal 524, the horizontal sync signal 525, and the signal VCLK 526 can be binarized and fetched in the memory circuit 15 in the same manner as in the above-mentioned steps (FIG. 19) since it coincides with the timing (FIG. 8) of an image input from the original table through the CCD by setting the signal 547 to "Lo" through the I/O port 23 to select the B terminal of the selector 10 in FIG. 3. Therefore, the same effect as in FIG. 17 can be obtained.

As described above, according to the embodiment of the present invention, an image input unit or processing unit of a digital color copying machine comprises a means for reproducing monochrome signals based on color-separated R, G, and B color component signals and binarizing the reproduced signals, a memory means for storing the binary image data for at least a predetermined area, and a means for reading out the stored binary image data in synchronism with reading of a color image. When substitution of color image data by the binary data is independently controlled in units of colors in synchronism with reading and outputting of each color image, various image/character edit functions, which cannot be realized by a color image input-/output apparatus based on a conventional real time image input/output method can be realized by an inexpensive, simple apparatus.

According to the present invention, as described above, a convenient character/image edit function can be effectively realized in units of colors without using a complicated printing process or an expensive system, thus improving a throughput of an output.

In the above embodiment, a color printer 15 for outputting an image using output data 522 of the enlargement/reduction circuit 14 may be one which can output a color image, such as a color laser beam printer, a color ink-jet printer, a color dot printer, a color thermal transfer printer, a cycolor printer, and the like.

An external device connected to the interface circuit 19 may be a device which can output image data, such as an SV camera, a video camera, a computer, another image reading means, and the like. Since image data input from the interface circuit 19 can be stored in either the binary memory circuit 15 or multivalue memory circuit 16, various image data sources may be used as compared to a case wherein an input means is limited to a reader (CCD 1), thus realizing a variety of image processing operations.

The present invention is not limited to the above embodiment, and various changes and modifications may be made within the spirit and scope of the appended claims.

What is claimed is:

1. An image processing apparatus comprising:
   first and second input means for inputting color image data consisting of a plurality of color components;
   memory means for storing first image data input by said first or second input means as binary image data; and
   processing means for processing second image data input by said first or second input means using said first image data stored in said memory means.

2. An apparatus according to claim 1, wherein said first input means includes a CCD line sensor for reading an original image as a plurality of color component data in units of pixels, and said second input means comprises means for inputting image data from an external device.

3. An apparatus according to claim 1, wherein said memory means comprises a bit map memory for storing binary data.

4. An apparatus according to claim 1, wherein said memory means comprises a memory for storing multivalue data.

5. An apparatus according to claim 1, wherein said processing means synthesizes said first image data with said second image data.

6. An apparatus according to claim 1, further comprising:
   designating means for designating a predetermined area of said second image data,
   wherein said processing means processes an image in the area designated by said designating means.

7. An apparatus according to claim 6, wherein said designating means can designate a plurality of rectangular areas.

8. An apparatus according to claim 7, wherein said designating means comprises a digitizer.

9. An apparatus according to claim 2, wherein said processing means selects data necessary for image synthesis from a plurality of image data including said first and second image data in units of pixels.

10. An apparatus according to claim 9, further comprising:
    means for generating area data,
    wherein said area generating means generates the area data based on the area designated by said designating means, and said processing means selects necessary data from the plurality of image data in accordance with the area data.

11. An image processing apparatus comprising:
    input means for inputting image data;
    first varying means for varying a size of an image represented by first image data input by said input means;
    synthesizing means for synthesizing image data output from said first varying means and second image data input by said input means; and
    second varying means for varying a size of an image represented by the output image data from said synthesizing means.

12. An apparatus according to claim 11, wherein, as said input means, one of image reading means including a CCD line sensor for reading an original image as a plurality of color component data in units of pixels and image data input means from an external device is selectively used.

13. An apparatus according to claim 11, wherein said first and second varying means comprise a plurality of first-in/first-out memories.

14. An apparatus according to claim 11, wherein said synthesizing means selects data necessary for image synthesis from a plurality of image data including said first and second image data in units of pixels.

15. An apparatus according to claim 14, further comprising:
means for generating area data,
wherein said synthesizing means selects necessary data from the plurality of image data in accordance with said area data.

16. An apparatus according to claim 15, wherein said synthesizing means comprises a selector.

17. An apparatus according to claim 11, further comprising memory means for storing the first image data.

18. An apparatus according to claim 17, wherein said memory means comprises a binary bit map memory.

19. An apparatus according to claim 17, wherein said memory means comprises a multivalue memory.

20. An apparatus according to claim 17, wherein said first varying means varies the size of the image represented by said first image data before or after said first image data is stored in said memory means.

21. An image processing apparatus for digitally processing a color image, comprising:
designation means for designating an area of an image represented by first image data; and
synthesizing means for synthesizing second image data in the area designated by the designation means,
wherein said synthesizing means changes the first image data of the area where the second image data is not present within the designated area into predetermined color data.

22. An apparatus according to claim 21, wherein said image processing apparatus comprises a digital color copying machine for frame-sequentially outputting an image.

23. An apparatus according to claim 21, further comprising:
input means for inputting said first and second image data.

24. An apparatus according to claim 23, wherein said input means comprises reading means for separating and reading an original image into a plurality of color components in units of pixels.

25. An apparatus according to claim 21, further comprising:
first memory means for storing said second image data.

26. An apparatus according to claim 25, wherein said first memory means comprises a bit map memory for storing binary data.

27. An apparatus according to claim 21, further comprising:
second memory means for storing said third image data.

28. An apparatus according to claim 27, wherein said second memory means stores the third image data associated with colors having no area data.

29. An apparatus according to claim 21, wherein said synthesizing means synthesizes said first, second, and third image data in units of lines.

30. An apparatus according to claim 29, wherein said synthesizing means includes a selector for selecting one of said first, second, and third image data in accordance with data associated with the area designated by said designating means.

31. An image processing apparatus for sequentially performing a series of image processing operations for input image data to output final image data, comprising:
first memory means for storing the input image data during the series of image processing operations as binary data; and
second memory means for storing said input image data during the series of image processing operations as multivalue data,
wherein said first and second memory means are controlled in accordance with a common timing signal.

32. An apparatus according to claim 31, further comprising:
reading means for reading an original image as color component signals in units of pixels.

33. An apparatus according to claim 31, wherein said first memory means stores character data.

34. An apparatus according to claim 31, further comprising:
synthesizing means for synthesizing first image data stored in said first memory means with second image data.

35. An apparatus according to claim 34, wherein said first image data is character data, and wherein said second image data is multivalue image data.

36. An apparatus according to claim 31, further comprising changing means for changing fourth image data using third image data stored in said second memory means.

37. An apparatus according to claim 36, wherein said third image data is multivalue density data, and wherein said changing means performs density modulation of said fourth image data.

38. An image processing method comprising the steps of:
inputting color image data consisting of a plurality of color components, by first or second input means;
storing first image data input in the inputting step as binary image data; and
performing image processing of said second image data input by said first or second input means using said first image data stored in the storing step.

39. A method according to claim 38, wherein said first input means comprises image reading means comprising a CCD sensor, and said second input means comprises means for inputting image data from an external device.

40. A method according to claim 38, wherein said storing step includes the step of binarizing said first image data.

41. A method according to claim 38, further comprising the step of designating a mode of said image processing.

42. A method according to claim 38, further comprising the step of repeating the image processing step for a plurality of output color components.

43. An image processing apparatus comprising:
input means for inputting color image data consisting of a plurality of color components;

generating means for generating binary image data;

synthesizing means for synthesizing in a desired color the binary image data into the color image data; and varying means for varying a size of an image represented by output data of said synthesizing means, wherein the output data of said synthesizing means is supplied into said varying means before synthesizing of the image data corresponding to one image plane by said synthesizing means is completed.

44. An apparatus according to claim 43, wherein the desired color can be selected from among plural colors.

45. An apparatus according to claim 43, wherein said synthesizing means consists of a selector.

46. An apparatus according to claim 43, wherein said varying means consists of a first-in/first-out memory.

47. An apparatus according to claim 43, wherein said apparatus comprises a color laser copying machine.

48. An apparatus according to claim 43, wherein said input means is a color image reader for scanning an original document and generating plural color component signals for each pixel.

49. An apparatus according to claim 48, further comprising second input means for inputting image data from an external device.

50. An image processing apparatus comprising:

input means for inputting first image data consisting of a plurality of color components;

generating means for generating second image data;

synthesizing means for synthesizing the second image data into the first image data, said synthesizing means changing a color of an outline of the second image data into a desired color; and varying means for varying a size of an image represented by output data of said synthesizing means.

51. An apparatus according to claim 50, wherein said generating means is a memory for storing binary data.

52. An apparatus according to claim 50, wherein said synthesizing means consists of a selector.

53. An apparatus according to claim 50, wherein said varying means consists of a first-in/first-out memory.

54. An apparatus according to claim 50, wherein said apparatus comprises a color laser copying machine.

55. An apparatus according to claim 50, wherein the output data of said synthesizing means is supplied into said varying means before synthesizing of the image data corresponding to one image plane by said synthesizing means is completed.

56. An apparatus according to claim 50, wherein said input is a color image reader for scanning an original document and generating plural color component signals for each pixel.

57. An apparatus according to claim 56, further comprising second input means for inputting image data from an external device.

58. An image processing apparatus comprising:

designating means for designating an area of an image represented by first image data;

changing means for changing a color represented by the first image data of the area designated by said designating means into a predetermined color;

synthesizing means for synthesizing second image data in the area designated by said designating means; and varying means for varying a size of an image represented by output data of said synthesizing means.

59. An apparatus according to claim 58, wherein said synthesizing means consists of a selector.

60. An apparatus according to claim 58, wherein said varying means consists of first-in/first-out memory.

61. An apparatus according to claim 58, wherein said apparatus comprises a color laser copying machine.

62. An apparatus according to claim 58, wherein the output data of said synthesizing means is supplied into said varying means before synthesizing of the image data corresponding to one image plane by said synthesizing means is completed.

63. An image processing apparatus comprising:

input means for inputting color image data consisting of a plurality of color components;

memory means for storing multivalue image data;

conversion means for converting a density of the color image data using the multivalue image data; and varying means for varying a size of an image represented by output data of said conversion means.

64. An apparatus according to claim 63, wherein said varying means consists of first-in/first-out memory.

65. An apparatus according to claim 63, wherein said apparatus comprises a color laser copying machine.

66. An apparatus according to claim 63, wherein said input means is a color image reader for scanning an original document and generating plural color component signals for each pixel.

67. An apparatus according to claim 64, further comprising second input means for inputting image data from an external device.

68. An apparatus according to claim 63, wherein said conversion means performs mutual calculation of the color image data and the multivalue image data.

69. An apparatus according to claim 66, wherein the mutual calculation is addition.

70. An image processing apparatus comprising:

reading means for scanning an original document and generating plural color component signals for each pixel;

conversion means for converting the color component signals generated by said reading means into frame-sequential color components, respectively;

input means for inputting image data from an external device;

selection means for selecting only one of the frame-sequential color components converted by said conversion means and the image data input by said input means; and processing means for processing output data of said selection means.

71. An apparatus according to claim 70, further comprising designating means for designating a predetermined area, and wherein said selection means is operated in accordance with designation by said designating means.

72. An apparatus according to claim 70, wherein said processing means synthesizes predetermined binary data into the output data of said selection means.

73. An apparatus according to claim 70, wherein said processing means converts a density of the output data by means of calculation using the output data of said selection means and predetermined multivalue data.

74. An apparatus according to claim 70, wherein said processing means varies a size of an image represented by the output of said selection means.

* * * * *

UNITED STATES PATENT AND TRADEMARK OFFICE
CERTIFICATE OF CORRECTION

PATENT NO. : 5,034,806
DATED : July 23, 1991
INVENTOR(S) : YOSHINORI IKEDA ET AL.

It is certified that error appears in the above-identified patent and that said Letters Patent is hereby corrected as shown below:

ON THE TITLE PAGE,
AT [75] INVENTORS

"Yoshinori Ikeda; Koichi Katoh, both of Kanagawa; Mitsuru Kurita, Tokyo; Hiroyuki Ichikawa, Kanagawa, all of Japan" should read --Yoshinori Ikeda, Kawasaki; Koichi Katoh, Yokohama; Mitsuru Kurita, Tokyo; Hiroyuki Ichikawa, Kawasaki; Yasumichi Suzuki, Tokyo, all of Japan--.

SHEET 15 OF 24

Figure 19:
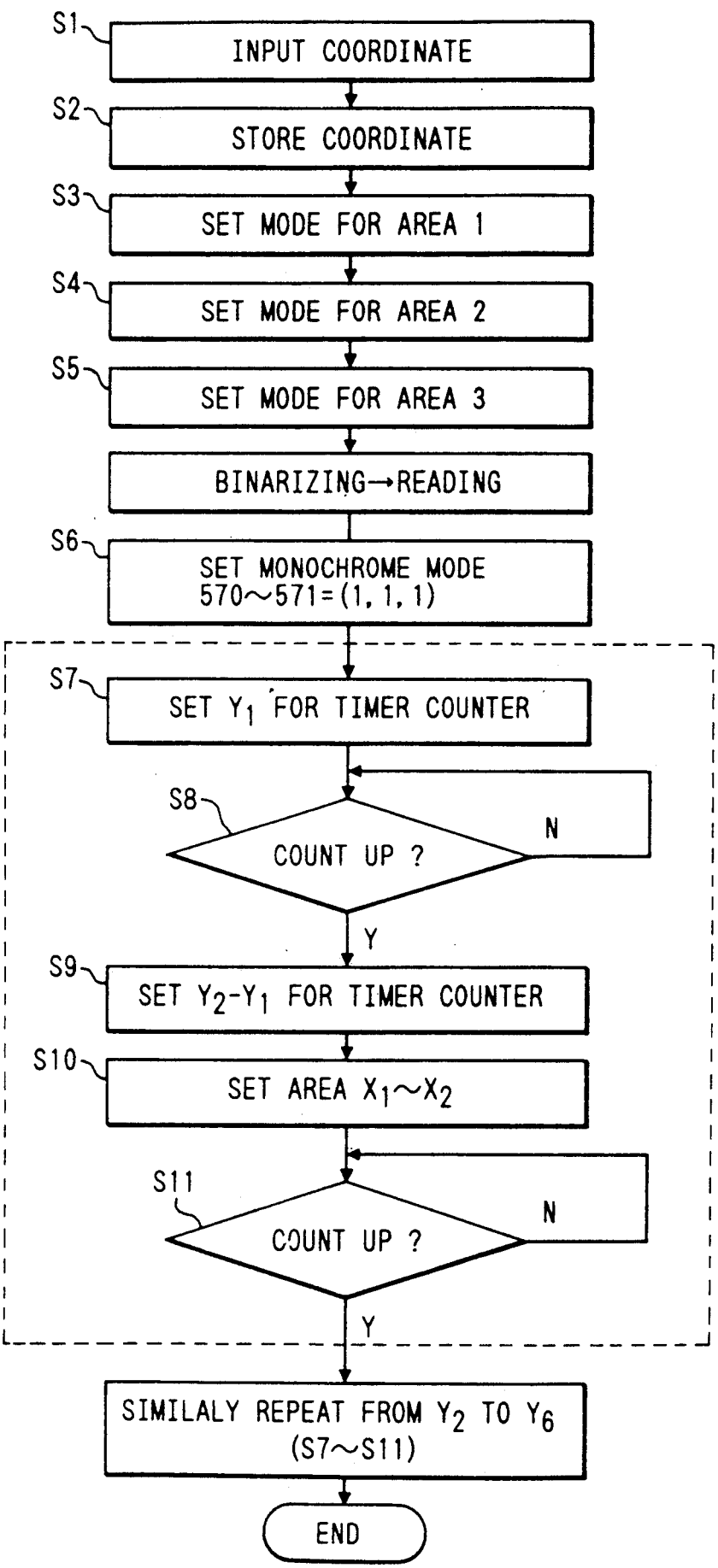
FIG. 19 is a flow chart of a memory fetch operation.
Figure 20A:
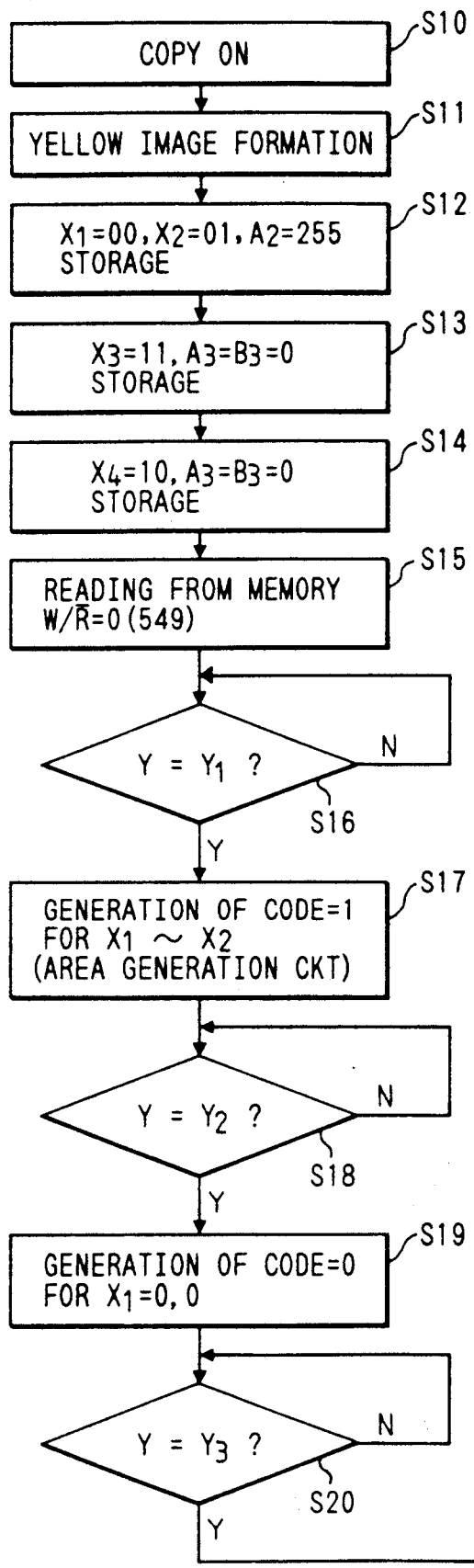

FIG. 19, "SIMILALY" should read --SIMILARLY--.

COLUMN 1

Figure 1:
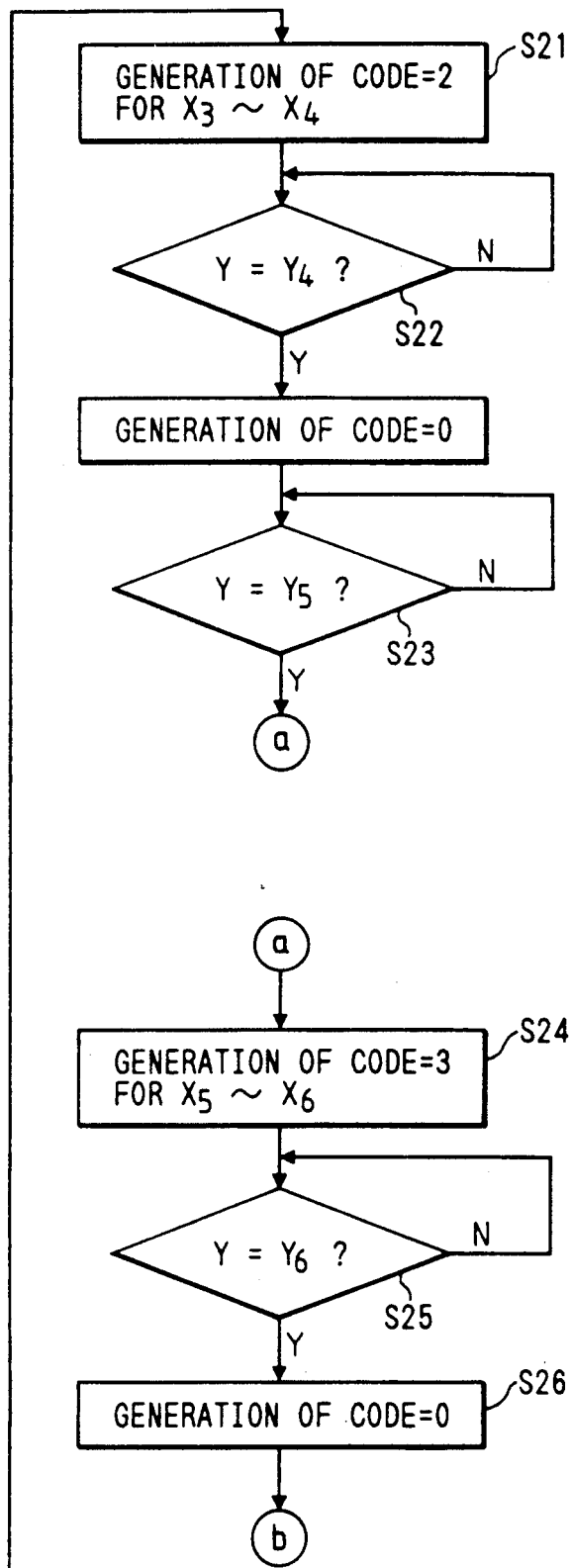
FIG. 1 is views for explaining conventional functions.
Figures 2, 20A:
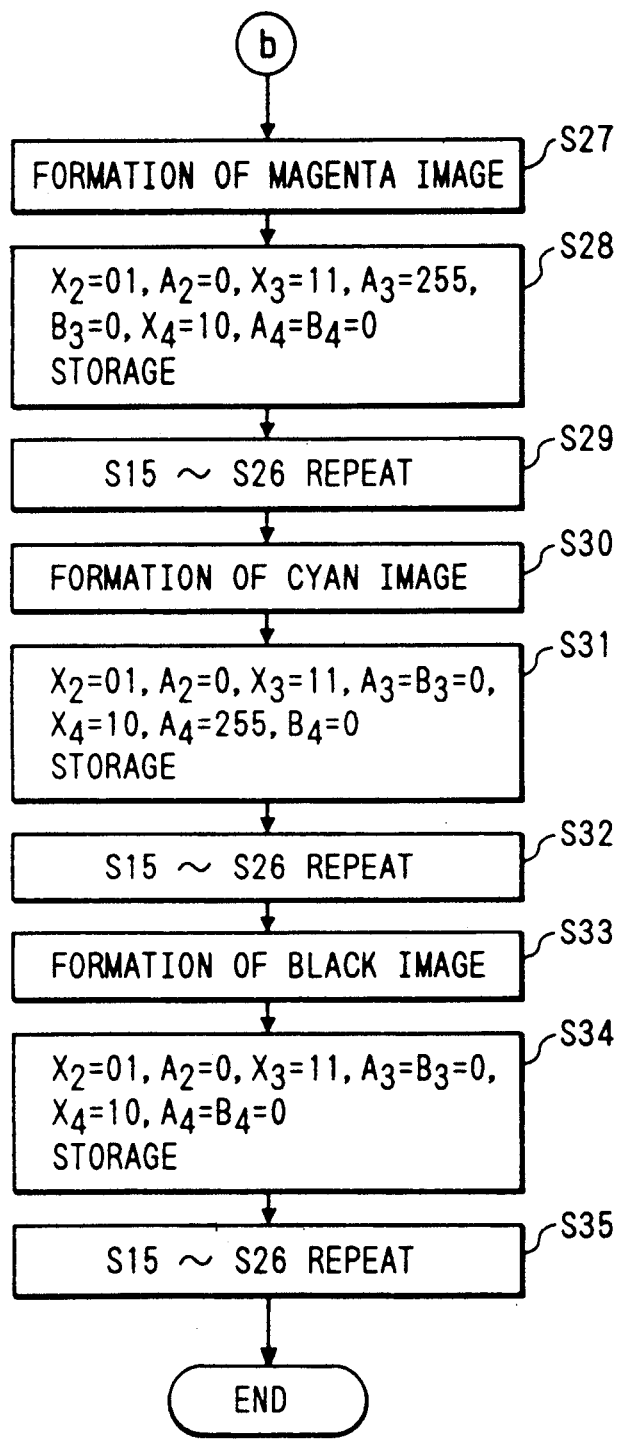

Line 26, "(FIG. 1 1," should read --(FIG. 1①),--.
Line 27, "(FIG. 1 2," should read --(FIG. 1②),--.
Line 28, "(FIG. 1 3," should read --(FIG. 1③),--.
Line 30, "(FIG. 1 4," should read --(FIG. 1④),--.
Line 44, "characters 1," should read --characters①,-- and "framed 2," should read --framed②,--.
Line 46, "effect 3," should read --effect③--.

COLUMN 2

Line 38, "means," should read --means, and in which the synthesizing means changes an area--.

COLUMN 3

Line 18, "EMBODIMENTS:" should read --EMBODIMENTS--.
Line 68, "the" should read --this--.

UNITED STATES PATENT AND TRADEMARK OFFICE
CERTIFICATE OF CORRECTION

PATENT NO. : 5,034,806
DATED : July 23, 1991
INVENTOR(S) : YOSHINORI IKEDA ET AL.

It is certified that error appears in the above-identified patent and that said Letters Patent is hereby corrected as shown below:

COLUMN 5

Line 35, "circuit 16" should read --circuit 15--.

COLUMN 10

Line 46, "claim 2," should read --claim 6,--.

COLUMN 13

Line 51, "input" should read --imput means--

COLUMN 14

Line 29, "claim 64," should read --claim 66,--.
Line 35, "claim 66," should read --claim 68,--.
Line 66, "output" should read --output data--.

Signed and Sealed this

Sixteenth Day of June, 1992

Attest:

DOUGLAS B. COMER

*Attesting Officer*   *Acting Commissioner of Patents and Trademarks*